(12) United States Patent
Zhang et al.

(10) Patent No.: US 11,272,472 B2
(45) Date of Patent: **\*Mar. 8, 2022**

(54) SYSTEM AND SCHEME FOR UPLINK SYNCHRONIZATION FOR SMALL DATA TRANSMISSIONS

(71) Applicant: Huawei Technologies Co., Ltd., Shenzhen (CN)

(72) Inventors: Liqing Zhang, Ottawa (CA); Yalin Liu, Shanghai (CN); Qinghai Zeng, Shanghai (CN); Xiaoying Xu, Shanghai (CN); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 295 days.

This patent is subject to a terminal disclaimer.

(21) Appl. No.: 16/511,674

(22) Filed: Jul. 15, 2019

(65) Prior Publication Data

US 2019/0342848 A1 Nov. 7, 2019

Related U.S. Application Data

(63) Continuation of application No. 15/823,471, filed on Nov. 27, 2017, now Pat. No. 10,356,740.
(Continued)

(51) Int. Cl.
*H04W 56/00* (2009.01)
*H04W 74/00* (2009.01)
(Continued)

(52) U.S. Cl.
CPC ...... *H04W 56/0045* (2013.01); *H04B 7/0421* (2013.01); *H04W 56/0005* (2013.01); *H04W 74/006* (2013.01); *H04W 74/0833* (2013.01)

(58) Field of Classification Search
None
See application file for complete search history.

(56) References Cited

U.S. PATENT DOCUMENTS 9,699,779 B2  7/2017  Marinier et al.
10,631,319 B2 * 4/2020 Li ........................ H04W 4/70
(Continued)

FOREIGN PATENT DOCUMENTS

CN  102917393 A   2/2013
CN  103428786 A  12/2013
(Continued)

OTHER PUBLICATIONS

Nokia et al., "Data transmission in Inactive", 3GPP TSG-RAN WG2 Meeting #96, R2-167706, Nov. 14-18, 2016, 7 Pages, Reno, USA.
(Continued)

*Primary Examiner* — Shripal K Khajuria
(74) *Attorney, Agent, or Firm* — Slater Matsil, LLP

(57) ABSTRACT

A method and apparatus for timing advance (TA) synchronization for uplink (UL) data transmissions are provided. A base station transmits a TA instruction to a UE. The TA instruction indicates one of at least two TA options. The first TA option indicates direct initial grant-free (GF) uplink (UL) data transmissions. The second TA option indicates indirect initial GF UL data transmissions with the UE initiating TA reference signaling for updating a TA parameter of the UE. The UE performs an initial GF UL data transmission to the base station based on the TA instruction.

20 Claims, 12 Drawing Sheets

Related U.S. Application Data

(60) Provisional application No. 62/427,680, filed on Nov. 29, 2016.

(51) Int. Cl.
*H04B 7/0417* (2017.01)
*H04W 74/08* (2009.01)

(56) References Cited

U.S. PATENT DOCUMENTS

| | | |
|---|---|---|
| 2014/0148186 A1 | 5/2014 | Zhou et al. |
| 2014/0171062 A1 | 6/2014 | Fallgren et al. |
| 2014/0177536 A1 | 6/2014 | Novak et al. |
| 2014/0241262 A1 | 8/2014 | Novak et al. |
| 2014/0321406 A1 | 10/2014 | Marinier et al. |
| 2015/0063247 A1 | 3/2015 | Lee et al. |
| 2017/0288817 A1 | 10/2017 | Cao et al. |
| 2018/0098360 A1* | 4/2018 | Vos ............... H04W 72/14 |
| 2019/0254052 A1* | 8/2019 | Liu ................ H04W 52/0254 |

FOREIGN PATENT DOCUMENTS

| | | |
|---|---|---|
| WO | 2007075559 A2 | 7/2007 |
| WO | 2014025292 A1 | 2/2014 |
| WO | 2015115794 A1 | 8/2015 |
| WO | 2017182053 A1 | 10/2017 |

OTHER PUBLICATIONS

Sierra Wireless, "Transmission of Data Grant-Free in Inactive State", 3GPP TSG RAN WG2 Meeting #96, R2-168595, Nov. 1-18, 2016, 10 Pages, Reno, Nevada, USA.

Huawei et al. "Evaluation on Subcarrier Spacing and CP Types for UL Transmission", 3GPP TSG RAN WG1 Meeting #86bis, R1-1609426, Oct. 10-14, 2016, 5pgs, Lisbon, Portugal.

Sierra Wireless, "Transmission of Data Grant-Free in New State", 3GPP TSG RAN WG2 Meeting #95bis, R2-166059, Oct. 10-14, 2016, 8 pages, Kaohsiung, Taiwan.

CATT, "Small Data Transmission in Inactive State", 3GPP TSG-RAN WG2 Metting #95bis, R2-166118, Oct. 10-14, 2016, 4 pages, Kaohsiung, Taiwan.

CMCC, "Consideration on UL Data Transmission in New UE State", 3GPP TSG-RAN WG2 Meeting #96, R2-168752, Nov. 14-18, 2018, 4 pages, Reno Nevada.

Fujitsu, "Discussion on grant-free transmission for UL multiple access", 3GPP TSG RAN WG1 Meeting #86bis, R1-1608803, Oct. 10-14, 2016, 2 Pages, Lisbon, Portugal.

* cited by examiner

| INDEX FOR 3-TUPLE | {p1} INTIAL TX | {p2} 1st RE-TX | {p3} 2nd RE-TX |
|---|---|---|---|
| 1 | p11 | p21 | p31 |
| 2 | p12 | p22 | p32 |
| 3 | p13 | p23 | p33 |

302

| INDEX FOR 3-TUPLE | {p1} INTIAL TX | {p2} 1st RE-TX | {p3} 2nd RE-TX |
|---|---|---|---|
| 1 | p11 | p21 | p31 |
| 2 | p12 | p21 | p31 |
| 3 | p13 | p22 | p32 |
| 4 | p14 | p22 | p32 |
| 5 | p15 | p21 | p32 |

304

| INDEX FOR 3-TUPLE | {p1} INTIAL TX | {p2} 1st RE-TX | {p3} 2nd RE-TX |
|---|---|---|---|
| 1 | p11 | p21 | p21 |
| 2 | p12 | p21 | p21 |
| 3 | p13 | p22 | p22 |
| 4 | p14 | p22 | p22 |
| 5 | p15 | p23 | p23 |
| 6 | p16 | p23 | p23 |

OPTION 1

| p1 | DATA 1 |
|---|---|
| p2 | DATA 2 |
| p3 | DATA 3 |

OPTION 2

| PREAMBLE | DATA 1 |
|---|---|
|  | DATA 2 |
|  | DATA 3 |

FIG. 3D

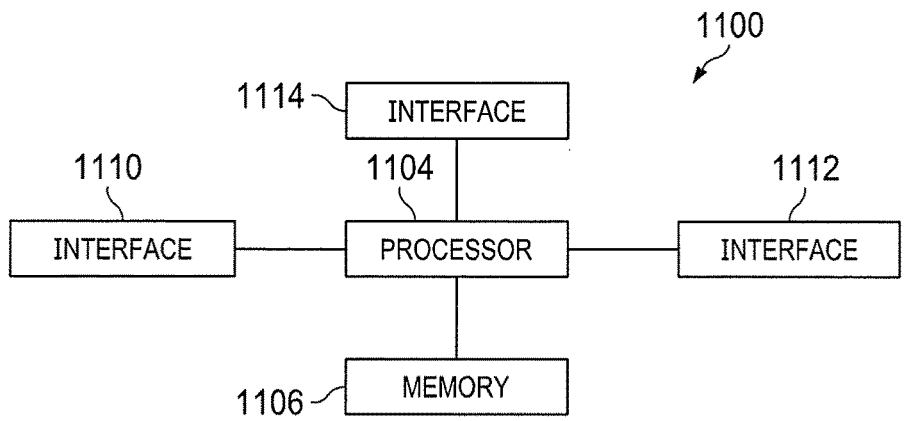
FIG. 11
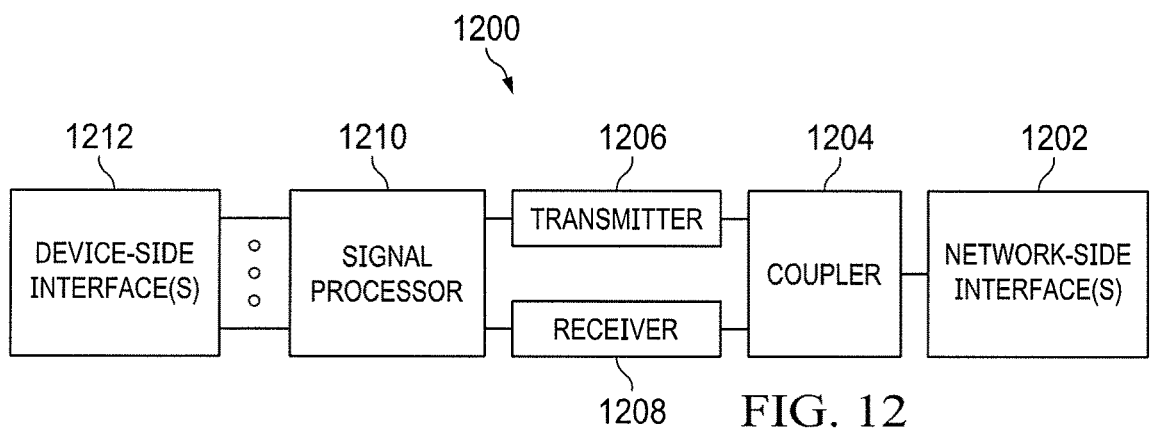
FIG. 12
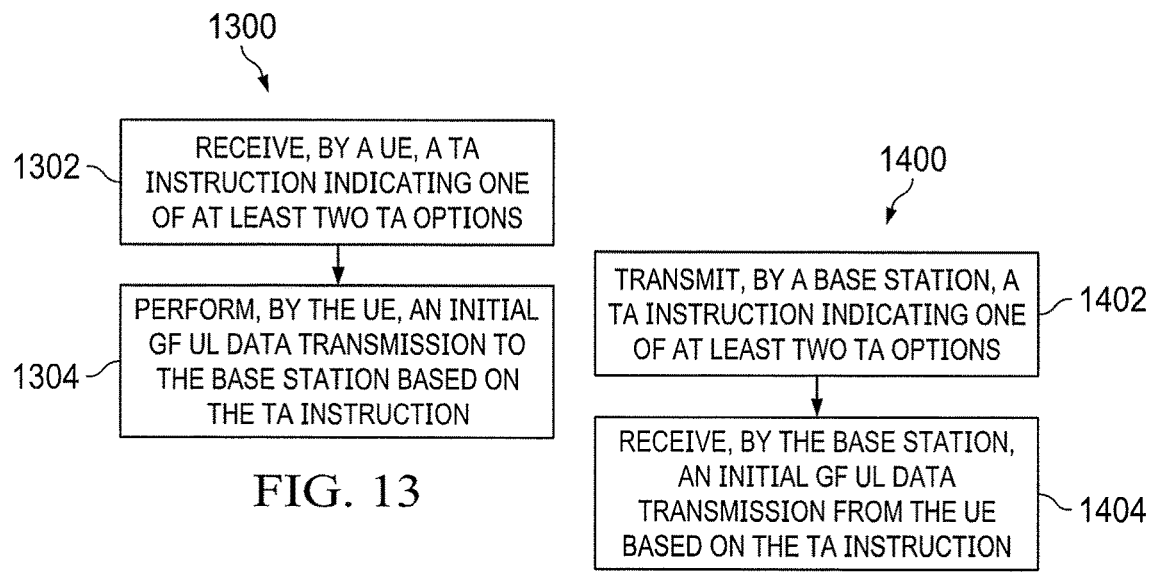
FIG. 13
FIG. 14

SYSTEM AND SCHEME FOR UPLINK SYNCHRONIZATION FOR SMALL DATA TRANSMISSIONS

This patent application is a continuation of U.S. application Ser. No. 15/823,471, filed on Nov. 27, 2017 and entitled "System and Scheme for Uplink Synchronization for Small Data Transmissions," which claims priority to U.S. Provisional Application No. 62/427,680, filed on Nov. 29, 2016 and entitled "System and Scheme for Uplink Synchronization for Small Data Transmissions," applications of which are hereby incorporated by reference herein as if reproduced in their entireties.

TECHNICAL FIELD

The present invention relates generally to wireless telecommunication systems, and, in particular embodiments, to a system and scheme for uplink synchronization for small data transmissions.

BACKGROUND

In fourth generation (4G) long term evolution (LTE) cellular networks, user equipments (UEs) are required to adjust timing advance parameters when performing uplink data transmissions in order to compensate for differences in propagation delays. In this way, UEs that are positioned further from a base station transmit their uplink data transmissions slightly earlier than UEs positioned nearer to the base station so that the respective uplink data transmissions are synchronized upon being received by the base station. In general, uplink data transmissions are considered to be synchronized when cyclic prefixes (CPs) of the respective uplink transmissions at least partially overlap in the time domain upon arrival at the base station.

In order to determine the appropriate timing advance for initial uplink data transmissions in 4G LTE cellular networks, UEs transmit a preamble over a random access channel (RACH) to a base station. The base station uses the preamble to determine the appropriate timing advance parameter adjustment, which is fed back to the UE so that it can be used to perform the initial uplink data transmission. As used herein, an "initial uplink data transmission" refers to a data transmission that is performed by a UE that is initially accessing a cell, or was otherwise operating in an idle (or idle-like) state prior to performing the data transmission. In one embodiment, an "initial uplink data transmission" may be the first packet transmission for the UE upon arrival of a burst of multiple data packets.

SUMMARY

A method and apparatus for timing advance (TA) synchronization are provided.

In an embodiment, a user equipment (UE) receives a timing advance (TA) instruction from a base station. The TA instruction indicates one of at least two TA options. The first TA option indicates direct initial grant-free (GF) uplink (UL) data transmissions. The second TA option indicates indirect initial GF UL data transmissions with the UE initiating TA reference signaling for updating a TA parameter of the UE. The UE performs an initial GF UL data transmission to the base station based on the TA instruction.

In some embodiments, when the TA instruction indicates the first TA option, the UE may perform the initial GF UL data transmission to the base station without transmitting TA reference signaling for updating the TA parameter of the UE.

The TA instruction may be transmitted by the base station to the UE using a broadcast signal. The TA instruction may also be transmitted by the base station to the UE using a Radio Resource Control (RRC) signal. In one embodiment, a TA reference signal sent by the UE is a preamble.

In conventional systems, a UE updates its TA parameter upon expiration of a timer. In contrast, in the present disclosure, a UE may receive the TA instruction in response to the base station determining one of the at least two TA options. In some embodiments, the base station determines one of the at least two TA options based on at least one of a cell size associated with the base station, a cyclic prefix (CP) type, or mobility of the UE. Further, in one embodiment, the base station determines one of the at least two TA options when the UE is in an inactive state or in an idle state. In another embodiment, the base station determines one of the at least two TA options when the UE moves out of the current cell of the UE.

In addition, in one embodiment, the TA instruction received by the UE further comprises a data transmission indication. The data transmission indication may indicate one of a pilot based data transmission, or a preamble based data transmission.

In some embodiments, when the TA instruction indicates the second TA option, the UE first may transmit a TA reference signal to the base station. Next, the UE may receive a TA adjustment message to update the TA parameter of the UE. Then, the UE may perform the initial GF UL data transmission to the base station based on the updated TA parameter of the UE.

In some embodiments, when the TA instruction indicates the second TA option, the UE may perform the initial UL data transmission with a TA reference signal to the base station. Before transmitting a TA adjustment message to the UE, the base station may perform signal detection on the initial GF UL data transmission using the TA reference signal for UE timing and channel estimation. Then, the UE may receive the TA adjustment message from the base station to update the TA parameter of the UE.

In some embodiments, after performing the initial GF UL data transmission to the base station, the UE receives an acknowledgement response from the base station. The acknowledgement response may indicate that the initial GF UL data transmission is unsuccessful. The acknowledgement response may further indicate whether retransmissions should be contention based or contention-free based. Then, the UE may perform retransmission of the initial GF UL data transmission to the base station based on the acknowledgment response.

In some embodiments, the TA instruction identifies one or more cells in which initial GF UL data transmissions are allowed without transmitting TA reference signaling for updating the TA parameter of the UE. When the UE enters one of the one or more cells indicated in the TA instruction, the UE may perform the initial GF UL data transmission to the base station without transmitting TA reference signaling for updating the TA parameter of the UE.

In some embodiments, the TA instruction identifies one or more cells in which initial GF UL data transmissions are allowed without transmitting TA reference signaling for updating the TA parameter of the UE. When the UE exits the one or more cells indicated in the TA instruction, the UE may receive a second TA instruction indicating one of the at least two TA options from the base station.

In one embodiment, when the TA instruction indicates the first TA option, the UE performs a first initial GF UL data transmission without transmitting TA reference signaling for updating the TA parameter of the UE. Next, the UE may transmit a TA reference signal to the base station based on UE measurement conditions. The UE measurement conditions may include at least one of channel variations, mobility, or locations in a cell. Then, the UE may receive from the base station an acknowledgement response. The acknowledge response may comprise a TA adjustment message. After the UE updates the TA parameter of the UE based on the acknowledgement response from the base station, the UE may perform a second initial GF UL data transmission to the base station.

In some embodiments, when the TA instruction indicates the first TA option, the UE performs a first initial GF UL data transmission without transmitting TA reference signaling for updating the TA parameter of the UE. Then, the UE may perform a second initial GF UL data transmission with a TA reference signal to the base station based on UE measurement conditions. The UE measurement conditions may include at least one of channel variations, mobility, or locations in a cell. Next, the base station performs signal detection on the second initial GF UL data transmission using the TA reference signal for timing and channel estimation of the UE. After the base station performs the signal detection, the UE may receive a TA adjustment message to update the TA parameter of the UE. Further, the UE may perform a third initial GF UL data transmission without transmitting TA reference signaling for updating the TA parameter of the UE.

In an embodiment, the base station transmits a timing advance (TA) instruction to the UE. The TA instruction indicates one of at least two TA options. The first TA option indicates direct initial grant-free (GF) uplink (UL) data transmissions. The second TA option indicates indirect initial GF UL data transmissions with the UE initiating TA reference signaling for updating a TA parameter of the UE. The base station receives an initial GF UL data transmission based on the TA instruction.

In some embodiments, when the TA instruction indicates the first TA option, the base station may receive the initial GF UL data transmission from the UE without receiving TA reference signaling for updating a TA parameter of the UE.

The base station may transmit the TA instruction to the UE using a broadcast signal. The base station may also transmit the TA instruction to the UE using a Radio Resource Control (RRC) signal. In one embodiment, a TA reference signal received by the base station is a preamble.

In conventional systems, a UE updates its TA parameter upon expiration of a timer. In contrast, in the present disclosure, a base station first determines one of the at least two TA options, and the base station transmits the TA instruction to the UE in response to the determining the TA option. In some embodiments, the base station may determine the one of the at least two TA options based on at least one of a cell size associated with the base station, a cyclic prefix (CP) type, or mobility of the UE. Further, in one embodiment, the base station determines one of the at least two TA options when the UE is in an inactive state or in an idle state. In another embodiment, the base station determines one of the at least two TA options when the UE moves out of the current cell of the UE.

In addition, in one embodiment, the TA instruction transmitted by the base station further comprises a data transmission indication. The data transmission indication may indicate one of a pilot based data transmission, or a preamble based data transmission.

In some embodiments, when the TA instruction indicates the second TA option, the base station first may receive a TA reference signal from the UE. Next, the base station may transmit a TA adjustment message to update the TA parameter of the UE. Then, the base station may receive the initial GF UL data transmission based on the updated TA parameter of the UE.

In some embodiments, when the TA instruction indicates the second TA option, the base station may receive the initial UL data transmission with a TA reference signal from the UE. The base station may perform signal detection on the initial GF UL data transmission using the TA reference signal for timing and channel estimation of the UE. Afterwards, the base station may transmit a TA adjustment message to the UE to update a TA parameter of the UE.

In some embodiments, after receiving the initial GF UL data transmission from the UE, the base station transmits an acknowledgement response to the UE. The acknowledgement response may indicate that the initial GF UL data transmission is unsuccessful. The acknowledgement response may further indicate whether retransmissions should be contention based or contention-free based. Then, the base station receives retransmission of the initial GF UL data transmission from the UE based on the acknowledgment response.

In some embodiments, the TA instruction identifies one or more cells in which initial GF UL data transmissions are allowed without the UE transmitting TA reference signaling for updating the TA parameter of the UE. When the base station detects that the UE enters one of the one or more cells, the base station may receive from the UE the initial GF UL data transmission without receiving TA reference signaling for updating the TA parameter of the UE.

In some embodiments, the TA instruction identifies one or more cells in which initial GF UL data transmissions are allowed without the UE transmitting TA reference signaling for updating the TA parameter of the UE. When the base station detects that the UE exits one of the one or more cells, the base station may transmit to the UE a second TA instruction indicating one of the at least two TA options. In one embodiment, when the TA instruction indicates the first TA option, the base station receives from the UE a first initial GF UL data transmission without receiving TA reference signaling for updating the TA parameter of the UE. Next, the base station receives from the UE a TA reference signal based on UE measurement conditions. The UE measurement conditions may include at least one of channel variations, mobility, or locations in a cell. Then, the base station may transmit to the UE an acknowledgement response. The acknowledge response may comprise a TA adjustment message. After the UE updates the TA parameter of the UE based on the acknowledgement response from the base station, the base station may receive a second initial GF UL data transmission to the base station.

In some embodiments, when the TA instruction indicates the first TA option, the base station receives from the UE a first initial GF UL data transmission without receiving TA reference signaling for updating the TA parameter of the UE. Then, the base station may receive from the UE a second initial GF UL data transmission with a TA reference signal based on UE measurement conditions. The UE measurement conditions may include at least one of channel variations, mobility, or locations in a cell. Next, the base station performs signal detection on the second initial GF UL data transmission using the TA reference signal for timing and channel estimation of the UE. After the base station performs the signal detection, the base station may transmit to the UE a TA adjustment message to update a TA parameter of the UE. Further, the base station may receive a third initial GF UL data transmission without receiving TA reference signaling for updating the TA parameter of the UE.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3B is a diagram of examples of index mappings;

FIG. 3D is a diagram of example formats for a message;

FIG. 11 illustrates a diagram of an embodiment communications device;

FIG. 12 illustrates a diagram of an embodiment computing platform;

FIG. 13 is a flowchart of an embodiment method for a UE to receive and process the timing advance (TA) instruction; and FIG. 14 is a flowchart of an embodiment method for a base station to transmit the timing advance (TA) instruction and receiving grant-free uplink transmissions from the UE.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
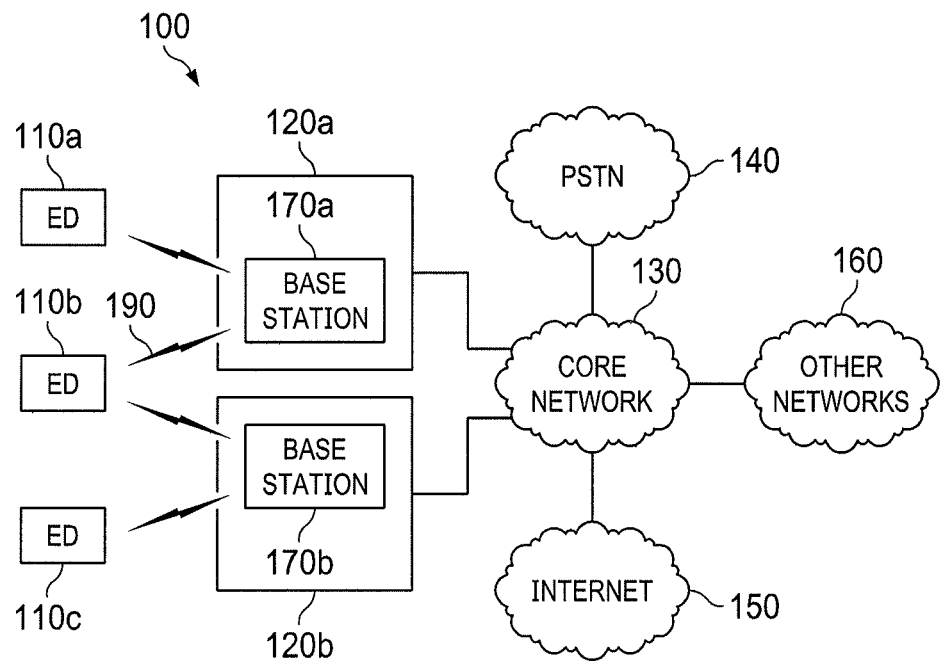
FIG. 1A illustrates a diagram of an embodiment wireless network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Next-generation wireless protocols will likely support grant-free uplink data transmissions in order reduce latency and overhead for small payload transmissions. As used herein, the term "grant-free uplink data transmission" refers to an uplink data transmission that is performed by a UE over uplink resources without requesting that the uplink resources be scheduled to carry the uplink data transmission. Grant-free uplink data transmissions may be performed over contention-based resources or persistently-scheduled resources. Grant-free uplink transmissions are sometimes called "grant-less", "schedule free", or "schedule-less" transmissions. Grant-free uplink transmissions from different UEs may be transmitted using the same designated resources, in which case the grant-free uplink transmissions are contention-based transmissions. One or more base stations, e.g. base station, may perform blind detection on the grant-free uplink transmissions.

One potential issue with supporting grant-free uplink data transmissions is how to synchronize initial grant-free uplink data transmissions without adding significant latency and overhead. As mentioned above, 4G LTE generally requires UEs to transmit a RACH preamble to a base station, and wait for a corresponding timing advance parameter adjustment to be received from the base station, before performing initial uplink transmissions. If this protocol were to be applied to initial grant-free uplink data transmissions, then much of the latency and overhead advantages derived from grant-free access would be lost.

Embodiments of this disclosure provide mechanisms for allowing initial grant-free uplink data transmissions to be performed directly without updating timing advance parameters. In some situations, synchronization may be achieved without adjusting for timing advance, such as when the cell size is small enough such that the maximum propagation delay does not exceed the CP duration or when the UE that performs the transmission is a located close to the base station (e.g., is a cell-center UE). In other situations, synchronization may be achieved using a previous timing adjustment parameter, such as when a static UE emerges from an idle mode. In some embodiments, a base station communicates a TA control signal that indicates whether initial grant-free or grant based uplink data transmission can be performed by one or more UEs in the cell without updating timing advance parameters. In one example, the timing advance instruction indicates that initial grant-free uplink data transmission can be performed directly, without updating a timing advance parameter, when a location or mobility parameter of a UE satisfies a criterion. In such an example, the location or mobility parameter of the UE may satisfy the criterion when the UE has moved less than a threshold distance since the timing advance parameter was previously (e.g., most recently) updated or set. Alternately, the location or mobility parameter of the UE may satisfy the criterion when the UE is located within a threshold distance of the base station or cell center. As yet another alternative, the location or mobility parameter of the UE may satisfy the criterion when the UE is located in the same cell as when the timing advance parameter was previously updated or set. In some examples, the base station may also transmit an instruction that specifies a cyclic prefix (CP) length required for uplink transmissions. The timing advance instruction and/or the instruction specifying the CP length may be transmitted via radio resource control (RRC) signaling.

In other embodiments of this disclosure, initial grant-free uplink data transmissions may be performed without updating timing advance parameters when a time period between the most recent timing advance parameter update and the initial grant-free uplink data transmission is less than a threshold. In yet other embodiments of this disclosure, a UE establishes a layer two entity corresponding to a synchronization security context with a radio access network (RAN), and performs data transmissions without updating a timing advance parameter until the layer two entity is released by the RAN. The layer two entity may be located at the Packet Data Convergence Protocol (PDPC) layer, the Media Access Control (MAC) layer, or the Radio Link Control (RLC) layer. The RAN may generally release the layer two entity via explicit RRC signaling. In some embodiments, an updated timing advance instruction may be sent following the expansion of a cell in order to indicate a transition by the cell from a synchronous state (where direct initial grant-free uplink data transmissions are permitted) to an asynchronous state (where direct initial grant-free uplink data transmissions are not permitted). In other embodiments, an updated timing advance instruction may be sent following the contraction of a cell in order to indicate a transition by the cell from an asynchronous state to a synchronous state.

In order to provide a contingency plan in the event that the initial grant-free uplink data transmission is not successfully decoded, and a re-transmission is necessary, a UE may also transmit a RACH preamble when performing the initial grant-free uplink data transmission. It should be appreciated that the initial grant-free uplink data transmission is nevertheless performed without updating the timing advance parameter because the initial grant-free uplink data transmission is sent before a corresponding RACH response is received. If the initial grant-free uplink data transmission is successfully decoded, then the base station sends an acknowledgement to the UE. However, if the base station is unable to decode the initial grant-free uplink data transmission, then the base station sends a negative acknowledgement, as well as a RACH response, to the UE. The negative acknowledgement indicates that the initial transmission was unsuccessful, and prompts a retransmission of the data. The RACH response includes a TA parameter for use in the data retransmission. In some embodiments, the RACH response also includes a scheduling assignment for the re-transmission, in which case the data re-transmission is a grant-based transmission, even though the initial data transmission was a grant-free transmission. These and other inventive aspects are described in greater detail below.

FIG. 1A illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1A, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1A, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1A illustrates one example of a communication system, various changes may be made to FIG. 1A. For example, the communication system 100 could include any number of EDs, base stations, networks, or other components in any suitable configuration.

Figure 1B:
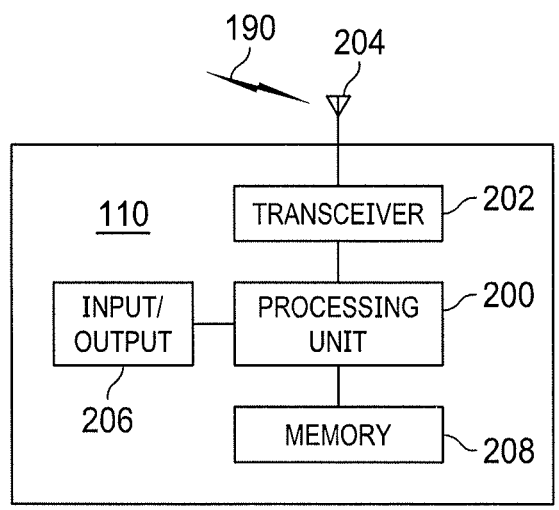
FIGS. 1B and 1C are diagrams of example devices that may implement the methods and teachings according to this disclosure.
Figure 1C:
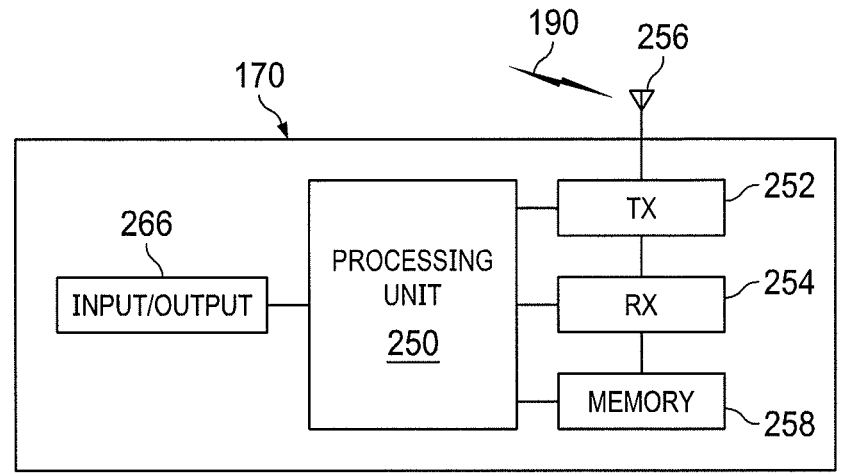

FIGS. 1B and 1C illustrate example devices that may implement the methods and teachings according to this disclosure. In particular, FIG. 1B illustrates an example ED 110, and FIG. 1C illustrates an example base station 170. These components could be used in the system 100 or in any other suitable system.

As shown in FIG. 1B, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Grant-free uplink transmissions are sometimes called "grant-less", "schedule free", or "schedule-less" transmissions. Grant-free uplink transmissions from different UEs 110a-110c may be transmitted using the same designated resources, in which case the grant-free uplink transmissions are contention-based transmissions. One or more base stations, e.g. base station 170, may perform blind detection on the grant-free uplink transmissions.

Grant-free uplink transmissions may be suitable for transmitting bursty traffic with short packets from the EDs 110a-110c to the base station 170a-170b, and/or for transmitting data to the base station 170a-170b in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to the applications described above.

FIG. 1A illustrates messages sent by EDs 110a-110c in a grant-free uplink transmission over uplink channel. The messages are transmitted using a multiple access (MA) resource. A MA resource is comprised of a MA physical resource (e.g. a time-frequency block) and at least one MA signature. The MA signature may include (but is not limited to) at least one of the following: a codebook/codeword, a sequence, an interleaver and/or mapping pattern, a demodulation reference signal (e.g. a reference signal for channel estimation), a preamble, a spatial-dimension, and a powerdimension. The term "pilot" refers to a signal that at least includes a reference signal. In some embodiments, the pilot may include the demodulation reference signal (DMRS), possibly along with a channel-estimation-oriented preamble, or a random access channel (LTE-like RACH) preamble.

As mentioned above, UEs in 4G LTE cellular networks are required to perform a RACH preamble procedure before making initial uplink data transmissions.

Figure 2A:
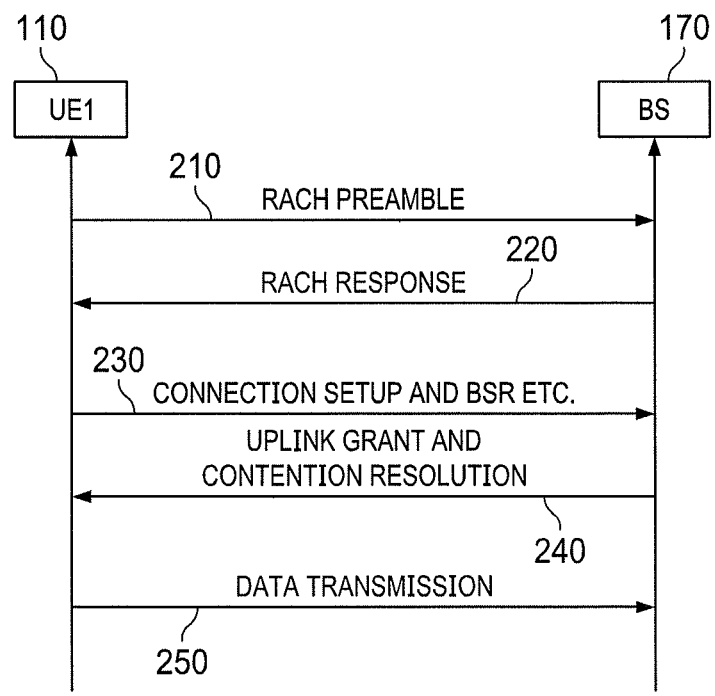
FIG. 2A is a protocol diagram of one embodiment for adjusting uplink timing advance (TA)

FIG. 2A is a protocol diagram of one embodiment for adjusting uplink timing advance (TA). As shown, the UE 110 sends a RACH preamble 210 to the base station 170 after entering the cell. The RACH preamble 212 may include a preamble ID. The base station 170 returns a RACH response 220 that includes a timing advance (TA) parameter adjustment value and scheduling grant, and the UE 110 adjust a timing based on the TA parameter to perform uplink synchronization. Thereafter, the UE 110 performs a connection setup and buffer status report (BSR) with a short data transmission in step 230. The BS allocates uplink scheduling grant based on the BSR and channel conditions in step 240, then in step 250 UE start a data transmission. The solution requires more latency and signaling overhead.

Once the UE 110 is initial access into the network, the network or the BS 170 configures its numerology settings, e.g., NCP/ECP, and SCS and association with the scenarios, applications, etc. The UE 110 needs to keep UL synchronized before data transmissions, and one way is the UE 110 sends a preamble first to acquire UL synchronization first and then the UE 110 can transmit data after TA adjustment on some scheduled resource. For the UE 110 initial transmissions, the transmission message can be a combination of at least one of preamble, pilot, data and UE ID. After the BS 170 receives the initial transmissions, the BS detects the initial transmissions and feedback HARQ based on the detection result.

Two possible ways of initial transmission, the first way is preamble with small data and the second way is direct data transmission without scheduling. For the first way, the preamble is used for transmission detection, and if the UE is asynchronized to the network, the preamble can be used to adjust UE's TA. For the second way, A pilot is transmitted with small data. This direct data transmission is based on the UL synchronization of UE is within CP (NCP or ECP).

Figure 3A:
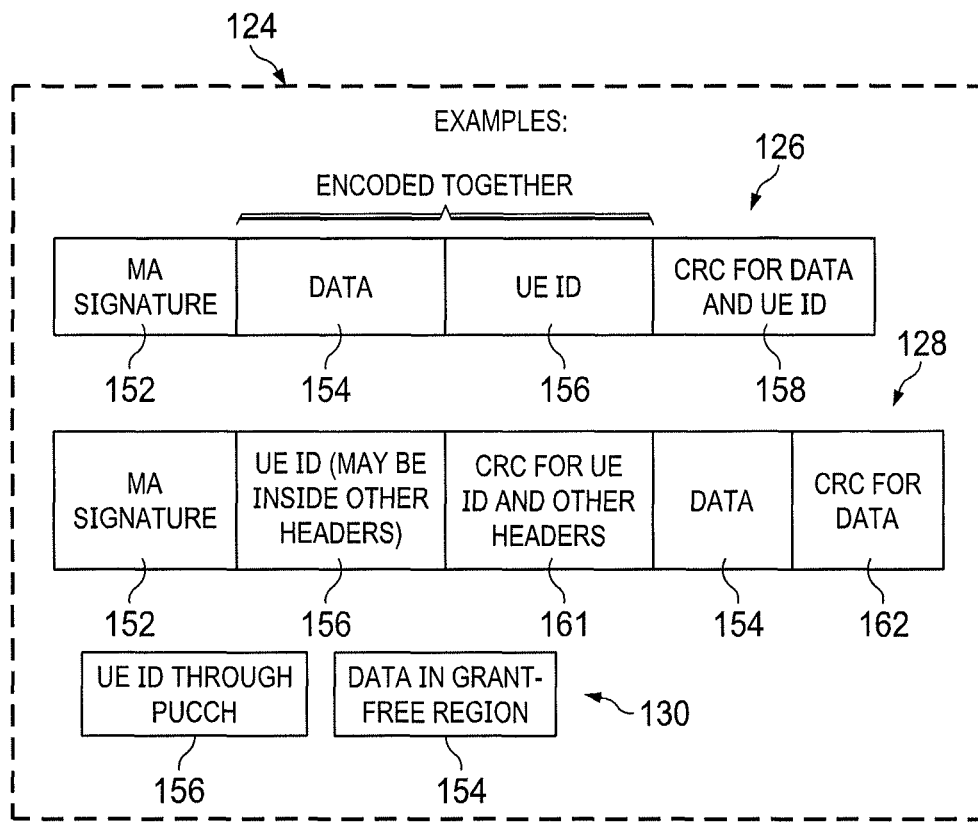
FIG. 3A is a diagram of example formats for a message.

FIG. 3A shows example formats for the message which are illustrated in stippled bubble 124. In example 126, the message includes a MA signature 152, as well as data 154 and an indication of the identity of the UE: UE ID 156. The data 154 and the UE ID 156 are encoded together, and a corresponding cyclic redundancy check (CRC) 158 is generated and included in the message 126. In some embodiments, the UE ID 156 is instead embedded in the CRC 158, which may reduce the payload size. In another example, the MA signature 152 may be optional if the signature was previously acknowledged for use. Example 128 is a variation of example 126 in which the UE ID 156 is separately encoded from the data 154. Therefore, a separate CRC 161 is associated with the UE ID 156. In some embodiments, the UE ID 156 may be inside one or more other headers, in which case the CRC 161 is for the headers in which the CRC 161 is located. In example 128, the UE ID 156 may be transmitted with a lower modulation and coding scheme (MCS) than the data 154 in order to facilitate decoding of the UE ID 156. There may be situations in which the UE ID 156 is successfully decoded, but the data 154 is not successfully decoded.

In examples 126 and 128, the MA signature 152 is illustrated as occupying separate time-frequency resources from the data 154, e.g. at the start of the message. This may be the case if, for example, the MA signature 152 consists of a reference signal and/or a preamble. However, the MA signature 152 may instead be part of the transmission scheme itself, e.g. the codebook used or the mapping pattern used, in which case the MA signature 152 would not occupy separate time-frequency resources from the data 154. Also, in embodiments in which the MA signature 152 does occupy separate time-frequency resources from the data 154, the resources do not necessarily have to be at the start of the message.

In another embodiment, the message may contain only a MA signature which is sent followed by a normal message that includes both a MA signature and data information.

In some embodiments, there may be a one-to-one mapping between an MA signature 152 and a UE or a one to more mapping between an MA signature 152 and multi UEs, which means that one MA signature may be shared by different UEs. That is, each UE is assigned use of a different MA signature that is known by the base station and the UE. For example, the base station and UE receives the allocation by the network or pre-configured by the network. When there is a mapping between an MA signature 152 and a UE, then successful detection of the MA signature 152 reveals the identity of the UE that sent the message. In embodiments in which there is a mapping between the MA signature 152 and the UE, the base station may use the MA signature 152 to check a lookup table to determine the identity of the UE that sent the MA signature 152. Also, in embodiments in which there is a mapping between the MA signature 152 and the UE, then the UE ID 156 may not even need to be transmitted as part of the message.

Example 129 shows a variation in which the UE ID 156 and the data 154 are transmitted through different resources. For example, the UE ID 156 may be transmitted as part of a control channel, such as a physical uplink control channel (PUCCH). The data 154 may be transmitted in a grant-free region of an uplink data channel. The MA signature is not illustrated in example 129, but the MA signature would be part of the data transmission.

When the UE sends a message to the base station, the base station first attempts to detect the MA signature. Detecting the MA signature is referred to as activity detection. By successfully performing activity detection, the base station knows that a UE has sent a grant-free uplink transmission. However, successful activity detection may or may not reveal the identity of the UE to the base station. If there is a one-to-one mapping between a UE and an MA signature, then successful activity detection reveals the identity of the UE that sent the grant-free uplink transmission. If there is not one-to-one mapping between a UE and a MA signature, then successful activity detection does not reveal the identity of the UE that sent the grant-free uplink transmission, although it may reveal that the UE is from a particular group of UEs, if different groups of UEs are assigned different MA signatures. In some embodiments, activity detection may further include obtaining the UE ID, e.g. if the UE ID is encoded separately from the data 154, as in example message 128.

After activity detection is successful, the base station then attempts to perform channel estimation based on the MA signature and optionally additional reference signals multiplexed with the data message, and then decode the data 154. If data decoding is also successful, then the base station can send an ACK to the UE in the downlink indicating that the base station has successfully decoded the data 154. In embodiments in which successful activity detection does not reveal the identity of the UE, then successful decoding of the rest of the message will reveal the identity of the UE, in which case the base station 170 will know the UE to which to send the ACK.

As one example, the MA signature 152 in example 126 may be a reference signal. The base station may first successfully perform activity detection by successfully decoding the reference signal sequence. The reference signal sequence may then be used by the base station for channel estimation of the uplink channel. To facilitate successful decoding of the reference signal, the reference signal may be transmitted with a low MCS. Once the reference signal is successfully decoded and channel estimation performed, the base station then decodes the payload having the data 154 and UE ID 156. The base station can then read the UE ID 156 to be informed of which UE the grant-free transmission came from. The base station can then send an ACK to the UE in the downlink indicating that the base station 170 has successfully decoded the data 154.

As mentioned above, in some embodiments there may be a mapping relationship between MA signatures and UEs, it can be one MA signature maps one UE, one MA signature maps multiples UEs. FIG. 3B illustrates three tables 302, 304, and 306, showing respective examples of the mapping. In table 302, the MA signature is a reference signal. A pool {P} of nine reference signals (i.e. nine MA signatures) are partitioned into three sets {P1}, {P2}, and {P3}. The reference signals may be pilots. Each row in table 302 represents a 3-tuple. In this example, the pool {P} is divided into three exclusive sets {P1}, {P2}, and {P3}, such that each set has three of the nine reference signals. Specifically, {P1} includes reference signals p11, p12, and p13, {P2} includes reference signals p21, p22, and p23, and {P3} includes reference signals p31, p32, and p33. Three of the nine reference signals are designated as initial reference signals, another three of the nine reference signals are designated as first retransmission reference signals, and the last three of the nine reference signals are designated as second retransmission reference signals. There is a one-to-one mapping between UEs and reference signals. For example, UE 110a may be assigned tuple index 1, UE 110b may be assigned tuple index 2, and UE 110c may be assigned tuple index 3. Therefore, when the base station 170 performs successful activity detection (i.e. successfully decodes the reference signal), then the base station 170 knows from the reference signal sequence which UE sent the grant-free uplink transmission. In the example in table 302, each reference signal sequence also indicates to the base station 170 whether the grant-free uplink transmission is an initial transmission, a first retransmission, or a second retransmission. In alternative embodiments, there may still be a one-to-one mapping between reference signals and UEs, but the reference signals may only be mapped to the identity of the UE and not mapped to initial transmissions or retransmission. For example, reference signal p11 may be assigned to a first UE, reference signal p12 may be assigned to a second UE, . . . , and reference signal p33 may be assigned to a ninth UE. Each of the nine UEs may then use their same assigned reference signal for their initial transmissions and retransmissions.

Table 304 is the same as table 302, the MA signature may be NOMA, LDP, IGMA, SCMA . . . all the 5G multiple access technology. Here taking SCMA for an example, the MA signature is a sparse code multiple access (SCMA) codebook. Nine SCMA codebooks {A1, A2, A3, B1, B2, B3, C1, C2, and C3} are partitioned into initial and retransmission sets and assigned to each one of UEs 110a-c using a one-to-one mapping. For example, the use of codebook A1 indicates to the base station that UE 110a sent the transmission, and that the transmission is an initial data transmission. In some embodiments, there may also be a one-to-one mapping between reference signals and SCMA codebooks. In such embodiments, the reference signal sequence or the SCMA codebook may be used to identify the UE and/or whether the transmission is an initial transmission, a first retransmission, or a second retransmission. Also, in such embodiments, identifying the reference signal sequence reveals the SCMA codebook used, and vice versa.

Table 306 is also the same as table 302, except instead of MA signatures, there is a one-to-one mapping between physical uplink resources used for the grant-free transmissions and UEs. Nine different time-frequency locations {A1, A2, A3, B1, B2, B3, C1, C2, and C3} are partitioned into initial and retransmission sets and assigned to each one of UEs 110a-c using a one-to-one mapping. For example, the receipt, by base station, of a grant-free uplink transmission on physical uplink resources A1 indicates to the base station that UE 110a sent the transmission, and that the transmission is an initial data transmission.

In the examples described above in relation to FIG. 3B, there is a mapping relationship between MA signatures or physical resources and the UEs. However, in some embodiments there does not have to be a one-to-one mapping to UEs. More generally, the mapping relationship between the different MA signatures or physical resources, i.e. the tuples in the tables in FIG. 3B, may be used to identify that the initial transmission and the retransmissions belong to the same packet. For example, UE 110a may use index tuple 1 in table 302 (p11, p21, p31) for a first data packet being transmitted to the base station, and UE 110a may use index tuple 2 (p12, p22, p32) for a second data packet being transmitted to the base station. In some embodiments, a UE may choose or be configured to use different tuples for different packets. In some embodiments, two UEs may choose the same tuple, e.g. if they randomly select MA signatures for the initial transmission, which may occur in mMTC applications.

HARQ procedures for grant-free uplink transmissions will now be described in more detail. HARQ procedures that already exist for grant-based schemes may not be applicable to grant-free uplink transmissions, because of the nature of grant-free uplink transmissions. For example, in a grant-free uplink transmission scheme, there may be no scheduling grant from the base station that specifies information such as which UEs are to transmit initial and retransmissions using which resources. Some of the systems and methods disclosed below may address problems such as how to perform ACK and/or NACK for grant-free uplink transmissions, how to determine and signal retransmission timing, and/or how to determine the transmission/retransmission attempt and the RV for HARQ operations.

As wireless networks evolve, diverse applications will require the networks to be able to serve different types of traffic and users in terms of quality of service (QoS) and capacity. For low latency applications, such as URLLC, and massive connectivity applications with a large number of users, such mMTC, as well as infrequent small packets in applications such as mMTC, URLLC and eMBB services, a user packet has to "arrive and go" to satisfy the latency requirements (e.g., URLLC) and/or to reduce signaling overhead (e.g., mMTC). Grant-free transmissions would be advantageous for these types of scenarios. For other applications, such as eMBB or large-packet transmissions with normal latency and reliability requirements, the grant-based schemes can be used. It is expected that a mix of grant-free and grant-based schemes will be simultaneously operational in future networks.

Therefore, a configuration procedure for users with grant-free and/or grant-based transmission schemes in a cell or the system would be beneficial for such future networks. For the above two ways, from the spectrum efficiency point, the preamble based solution needs at least one or multiple symbols to be used for the sequence transmission which will consume more resource if UE UL transmission is within CP, and the direct small data transmission, for the cells with large size, UE could be asynchronized with network. From Network deployment point, most cases would be small cell where UE transmission is within CP. But large cell size is also possible, for UEs which are in the cell edge, could be out of sync when UE is doing data transmission, while UEs in the central of the cell would normally be within the CP.

Figure 2B:
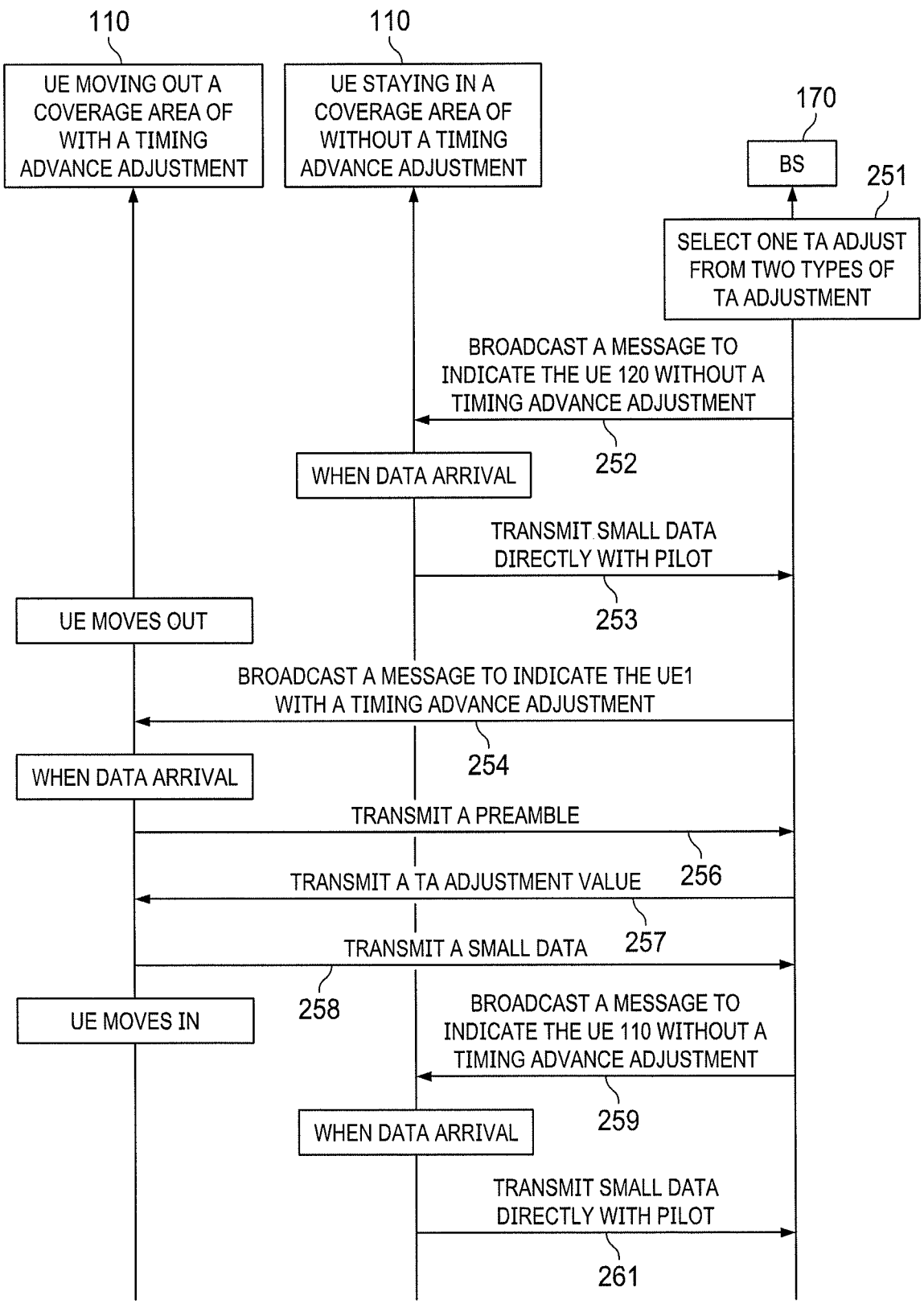
FIG. 2B is a protocol diagram of one embodiment for adjusting uplink timing advance (TA)

One embodiment shows in FIG. 2B, the BS broadcasts a message to UE 110 in its service coverage an indication of small data transmission, the broadcast can be in the minimum SI or on-demand SI/other SI.

Case 1: For appropriate cell sizes or UE 110 is staying in a coverage area of without a timing advance adjustment, in step 251 and 252, the BS Selects one TA adjustment from two types of TA adjustment, and the broadcast message could indicate UEs transmit small data directly with pilot directly in step 253. For large cells and static mobiles, once UL synched once (in the initial access), the round-trip-time has been compensated, and RTT variation could be too small to impact UL synched status with a configured CP; for large cells and mobile users within an appropriate centre region, NCP or ECP with TA free is also workable.

Case 2: For cells with too large cell sizes or the UE 110 moves out a coverage area of with a timing advance adjustment, the broadcast message could indicate UEs to transmit preamble first before small data transmission. The UE 110 in certain state such as idle or inactive, or cell edge, configure the users to transmit synch sequences, e.g., preambles, and adjust TA first by BS before data transmissions. The UE 110 is configured by dedicate RRC about the small data transmission. The configuration can be during the very initial access to the cell. The network can also configure UE at any time based on the property of UE, such as UE's location or service property etc.

In one embodiment, for the initial transmissions and response: In the above case 1, the UE 110 will simply perform "arrive and go" upon its data arrival: UE synchronizes with DL and uses either NCP or ECP with configured numerology; pilot/data/UE ID can be sent with either grant free (GF) or grant based (GB)UE, the detail shows in FIGS. 3A and 3C; For GF, pilot (RS or DMRS) can be used as UE activity detection, transmission identification and channel estimation; The retransmissions can be contention based or contention-free based on the response from gNB ACK/NACK. Grant-signaling.

In the above case 2, the UE 110 to transmit UL synch signal to the BS 170: Fixed mobile users in certain state such as idle, each data transmission will do the following; UE synchronizes with DL and uses either NCP or ECP with configured numerology; Send the synch signaling, e.g., preamble, BS will decode the preamble and provide information including TA to UE; If no response from BS, retransmit preamble with optional power boosts; perform the data transmissions in Case 1. For the above case 1 and case 2, the following embodiment will describe more details.

In one embodiment, before the BS broadcasts a message to UE 110, the BS will select one or more numerologies from sets 1 to 5 to a sub band based on the following table 1 configuration, in the details, the selected numerology is determined by different service and application, eg. for the URLLC UE, the BS selects set 4 or set 5, or both, for eMBB UE, the BS selects set 3 or set 4 or both, for mMTC, the BS selects set 1 or set 2 or both. Then the BS sends a broadcasting message to one or more UEs in its serving cell, in an aspect, the BS sends a RRC signaling to an individual UE based on the cell coverage sizes, or UE mobility. For an example, when a cell with a coverage of cell size is 450 meters, the BS send a TA free signaling to the UEs in the cell, the TA free signaling is used to indicate the UEs directly transmit data without TA parameter adjustment, and also the BS sends a message to indicate a numerology configuration including subcarrier spacing with 15 kHz, normal CP length with about 5 us. The TA free signaling and the massage can be sent in one broadcasting signaling, or separate signaling

TABLE 1

| Parameters | Set 1 | Set 2 | Set 3 | Set 4 | Set 5 |
| --- | --- | --- | --- | --- | --- |
| Subcarrier spacing (kHz) | 3.75 | 7.5 | 15 | 30 | 60 |
| CP length (usec) (NCP/ECP) | 20.8/66.7 | (10.4, 9.38)/33.3 | (5.2, 4.69)/16.67 | 8.33 (ECP) | 4.17 (ECP) |
| Upper bound for cell radius | 3000 m | 1500 m | 750 m | 1250 m | 625 m |
|  | 10,000 m | 5000 m | 2500 m |  |  |
| Upper bound for cell radius considering 2 μs delay spread | 2700 m | 1200 m | 450 m | 950 m | 325 m |
|  | 9700 m | 4300 m | 2200 m |  |  |

Figure 2C:
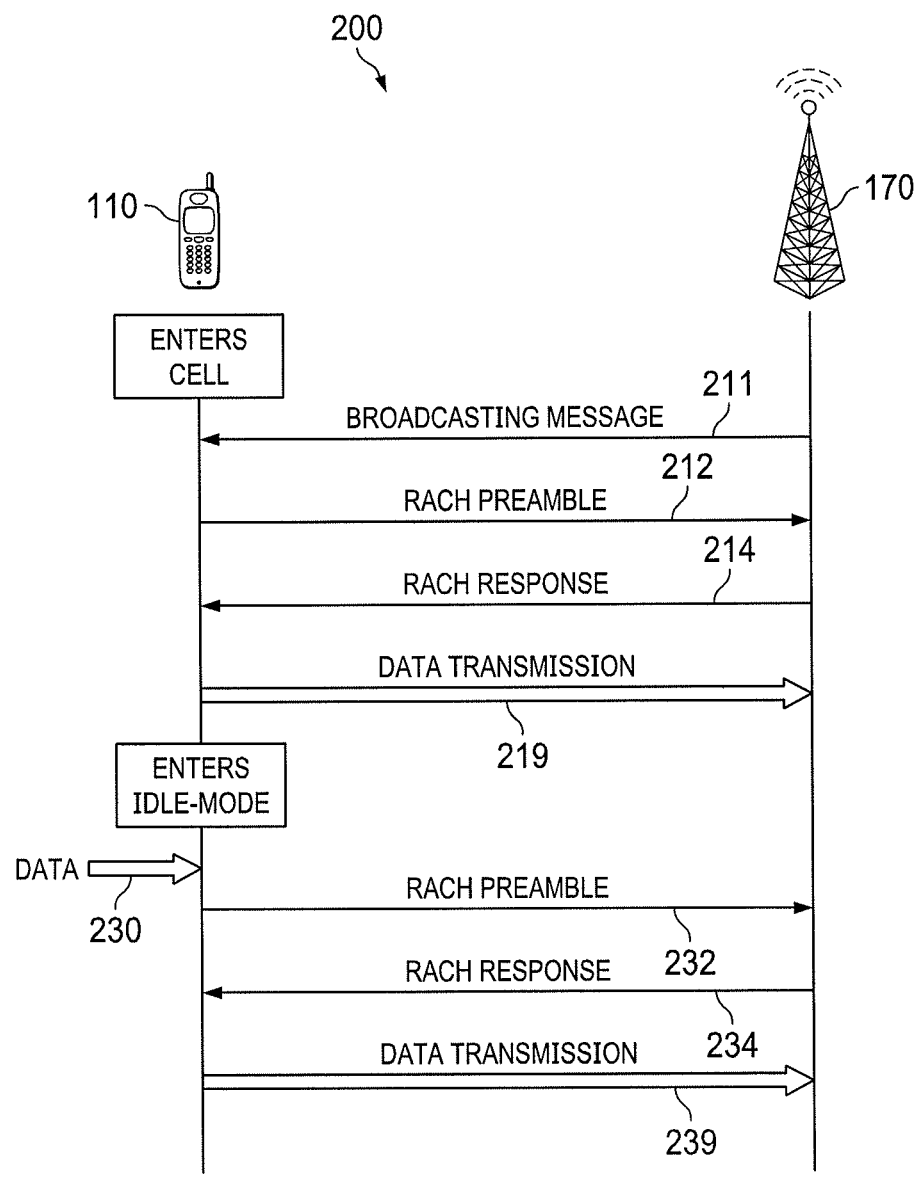
FIG. 2C is a protocol diagram of one embodiment when uplink is not synchronized.

FIG. 2C is a protocol diagram of one embodiment when uplink is not synchronized. As shown, the UE 110 enters the cell of the base station 170, the UE can receive a broadcasting message 211, for example, in a minimum system information (SI) or on-demand SI or other SI. The UE 110 sends a RACH preamble 212 to the base station 170 after entering the cell. The RACH preamble 212 may include a preamble ID. The base station 170 returns a RACH response 214 that includes a timing advance (TA) parameter adjustment value, which TA parameter adjustment value indicates a time difference to be adjusted for uplink synchronization. Then the UE 110 performs the uplink synchronization. Thereafter, when the UE 110 has data arrival, the UE 110 performs a data transmission 219 based on the timing advance value specified by the RACH response 214. At some point after performing the data transmission 219, the UE 110 enters an idle-mode (or an idle-like mode), and the UE can be synchronization or can lose synchronization based on a location or mobility parameter of the UE 110 satisfies a criterion.

In one embodiment, the broadcasting message 211 also includes numerologies to configure UEs. One aspect, the broadcast numerology related configurations for one or more sub-bands is used to indicate: in a sub-band with one or more numerology options: e.g., 15 KHz, 30 KHz, and 60 KHz SCS, the UEs in the sub-band will configure its numerologies using this sub-band. With different applications or services, the UEs can receives an RRC signalling to configure with specific numerologies, e.g., URLLC UE to configure 60 KHz SCS. For QoS/device types, based on the application QoS or types of device types, RRC singling configuration to a UE for its numerology configuration(s), e.g., a coverage related device can be configured with 3.75 KHz SCS. That is, for QoS/device types, based on the application QoS or device type, RRC signalling can be used to configure a UE on its numerology schemes, e.g., 3.75 KHz SCS. For an example, if the UE can support URLLC and eMBB services, and the UE receives 2 numerologies configuration from RRC signalling, or the UE preconfigured 2 numerologies configuration. the first numerology has 60 KHz SCS, the second numerology has a 30 KHz SCS, and the UE selects the first numerology for grant free uplink transmission, and select the second numerology for grant based uplink transmission. One of the examples of the numerology design is shown in the table 2.

TABLE 2

| First example numerology | | | | | |
|---|---|---|---|---|---|
| Subcarrier spacing (KHz) | 3.75 | 7.5 | 15 | 30 | 60 |
| Useful duration T_u (us) | 266.67 | 133.33 | 66.67 | 33.33 | 16.67 |
| CP length (us) | 20.84, 18.76 | 10.42, 9.38 | 5.2, 4.7 | 2.60, 2.34 | 1.30, 1.17 |
| # of symbols per TTI | 7 (1,6) | 7 (1,6) | 7 (1,6) | 7 (1,6) | 7 (1,6) |
| TTI (ms) | 2 | 1 | 0.5 | 0.250 | 0.125 |
| CP overhead | 6.7% | 6.7% | 6.7% | 6.7% | 6.7% |
| (1) Type 1 CP period (us) | 20.83 | 10.42 | 5.21 | 2.60 | 1.30 |
| (2) Type 2 CP period (us) | 18.75 | 9.38 | 4.69 | 2.34 | 1.17 |
| (3) OFDM useful part period (us) | 266.67 | 133.33 | 66.67 | 33.33 | 16.67 |
| Type 1 OFDM symbol (us): (1) + (3) | 287.50 | 143.75 | 71.88 | 35.94 | 17.97 |
| Type 2 OFDM symbol (us): (2) + (3) | 285.42 | 142.71 | 71.35 | 35.68 | 17.84 |

As can be seen from Table 1, for one type of numerology signal, subcarrier spacing and OFDM useful part have scaled relationship with the subcarrier spacing and OFDM useful part in other type of numerology signal. For example, in the numerology parameter set associated with subcarrier spacing 3.7 KHz, useful symbol duration (T_u) for each symbol is double the useful symbol duration (T_u) defined for subcarrier spacing 7.5 KHz. CP length and OFDM symbol in same type have scaled relationship with the CP length and OFDM symbol in other type of numerology signal while keeping the same CP overhead. For example, in the numerology parameter set associated with subcarrier spacing 3.7 KHz, the Type 1 CP/OFDM symbol and Type 2 CP/OFDM symbol lengths are double the respective Type 1 CP/OFDM symbol and Type 2 CP/OFDM symbol lengths defined for subcarrier spacing 7.5 KHz, such that the CP overhead for each parameter set is the same at 6.7%. Accordingly, TTI length has a scaled relationship with the TTI length in other type of numerology signal sets while keep the same number of symbols per TTI. In further, some parameters have a proportional scaled relationship between different sets with other parameters. Some parameters have reciprocal proportional scaled relationship between different sets with other parameters.

In one embodiment, if the broadcasting message 211 indicates the UE without updating timing advance parameters based on the BS's coverage area design, then the UE can directly transmit the data in step 239 without step 232 and 234, in this situation, the data format can be example 354, 329 and 326. The BS's coverage area design is determined by cell size, in detail, a cyclic prefix duration is determined based on a characteristic of a base station's coverage area, such as a coverage area size or coverage area type. For example, a longer cyclic prefix length may be used when a base station has a larger coverage area than when the base station has a smaller coverage area. As another example, a different cyclic prefix length may be used for different coverage types. Coverage area types may include an urban coverage area, a suburban coverage area, and a rural coverage area. In some embodiments, the characteristic of the base station's coverage area may be adjusted dynamically, and the cyclic prefix length may be updated based on the adjusted coverage area characteristic. These and other aspects are discussed in greater detail below.

Aspects of this disclosure achieve uplink synchronization without adjusting for timing advance by using cyclic prefix durations that are long enough to compensate for differences in propagation delay. However, the cyclic prefixes have duration (or cyclic prefix length) that is sufficient to compensate for the difference in propagation delay between the UEs and the base station 170. As a result, the uplink transmissions are synchronized without adjusting for timing advance, which means that timing advance reference signaling can be omitted from the uplink transmissions, thereby reducing overhead. It should be appreciated that the additional overhead attributable to the extended cyclic prefix durations in the uplink transmissions may be less than the overhead associated with timing advance reference signaling when the symbol duration of the uplink transmissions is short enough (e.g., below a threshold) and/or when the maximum propagation delay in the coverage area of the base station 170 is low enough (e.g., below a threshold).

Aspects of this disclosure, the BS 170 decides whether adjusting for timing advance based on the above CP length and supported coverage sizes. In detail, if the CP length is long enough to compensate for differences in propagation delay, the BS instructs to the UE 110 a signaling without timing advance adjustment, otherwise, the BS instructs a signaling with timing advance adjustment.

Aspects of this disclosure, if the UE 110 is a static UE, the network instruct to the UE 110 a signaling without timing advance adjustment regardless of the coverage sizes.

Aspects of this disclosure, if the UE 110 is a mobile UE, in one option, the BS instructs to the UE 110 a signaling without timing advance adjustment based on the BS detects the UE 110 is close to the BS or within the synchronizable coverage area. In another option, UE move out of the synchronizable coverage area, the BS instructs to the UE 110 a updated signaling with timing advance adjustment. In reference to FIG. 2c, after entering the idle mode, an inactive mode or in an active mode (not shown), the UE 110 receives, or otherwise generates, when data 230 are arrived, and UE 110 transmits a RACH preamble 232 to the base station 170. The base station 170 returns a RACH response 234 that specifies a timing advance value to the UE 110. The UE 110 uses the timing advance value adjustment specified by the RACH response 234 to update the timing advance parameter, and then sends the data transmission 239 to the base station 210 based on the updated timing advance parameter.

Figure 3C:
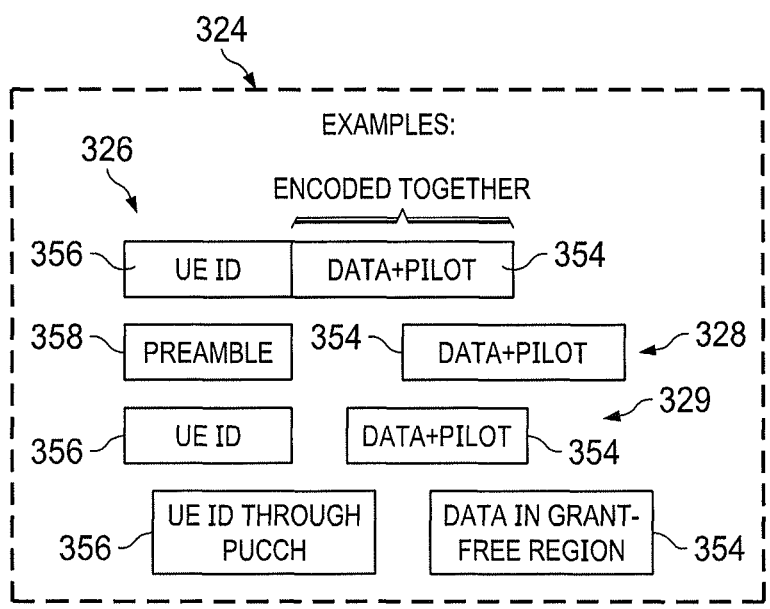
FIG. 3C is a diagram of a transmission format.

Aspects of this disclosure, for cells with too large cell sizes where CP length is not long enough to compensate for differences in propagation delay, the broadcast message could indicate mobile UEs to transmit preamble first before small data transmission, shown the data format 328 in FIG. 3C. Mobile UE 110 in certain state such as idle or inactive, or cell edge, configure the UE to transmit synch sequences, e.g., preambles, and adjust TA first by eNB, before data transmissions.

In one embodiment, the data transmission format can be shown in FIG. 3C. FIG. 3C shows another example formats for the message. In example 326, the message includes UE ID 356, and the combination of data and pilot 354. In example 328, a first message includes a preamble 358, the preamble 358, for an example, it can be sequence assigned to a URLLC UE for dedicated usage, the preamble 358 has a one to one mapping relationship with UE ID 356 for the URLLC UE. In another embodiment, the preamble 358, can link to its dedicated UE connection ID, the preamble 358 has a one to one mapping relationship with the UE connection ID. The UE connection ID can be a dedicated C-RNTI or an assigned C-RNTI. The first message can be transmitted separately from data, and the BS receives the first message and identify the URLLC UE based on the mapping relationship. Such a scheme can also be applicable to other services such as eMBB. A second message includes data and pilot. The BS receives the second message, detecting the pilot in the second message, then channel estimation using detected pilot and decode the data.

In an explicit way, in an example 329, UE ID only can be transmitted separately from data or only transmission data and pilot 354. A first message includes UE ID 356, a second message includes data and pilot 354. A BS receives the first message and identity the UE ID, the BS receives the second message, detecting the pilot in the second message, then channel estimation using detected pilot and decode the data.

In one embodiment, UE ID only can be transmitted separately from data for UE ID message can be protected by CRC; the first message can be transmitted in a different numerology with the second message. In detail, symbols used for UE ID message can apply different numerology from the symbols used for the data and pilot. In detail, symbols used for UE ID message can use a larger CP for UE ID message than the symbols used for the data and pilot.

In one embodiment, UE ID 356 of the example 329, preamble 358 of the example 328, or the pilot in the examples can also carry buffer status information as well as MCS for network to decide appropriate resource size in the UL grant for next transmissions of the UE.

In one embodiment, the BS broadcasts small data transmission indication based on pilot or preamble design, the BS can command UE which options should be used, the options shown in FIG. 3D. In option 1, the pilot and data design is the same with FIG. 3B, the pilot and data use the same frequency resources, the UE will transmit UL small data based on pilot if pilot based transmission is indicated in the broadcast message. In option 2, all the UEs share the same time frequency resources, data transmission resources can be FDM. The UE transmits UL small data based on preamble if preamble based transmission is indicated in the broadcast message. In one exception, the UE is configured by BS via RRC signaling to do small data transmission based on pilot even preamble based transmission is indicated in broadcast message. When a UE moves from one pilot based cell to a preamble based cell, the first transmission should be preamble based.

As mentioned above, requiring UEs to update a timing advance parameter before performing initial grant-free uplink data transmissions in next-generation wireless networks would significantly reduce the latency and overhead advantages derived from grant-free access. Embodiments of this disclosure provide mechanisms that enable initial grant-free uplink data transmissions to be performed directly, without updating timing advance parameters, in scenarios where synchronization is likely to be achieved without timing advance parameter adjustment.

Figure 3E:
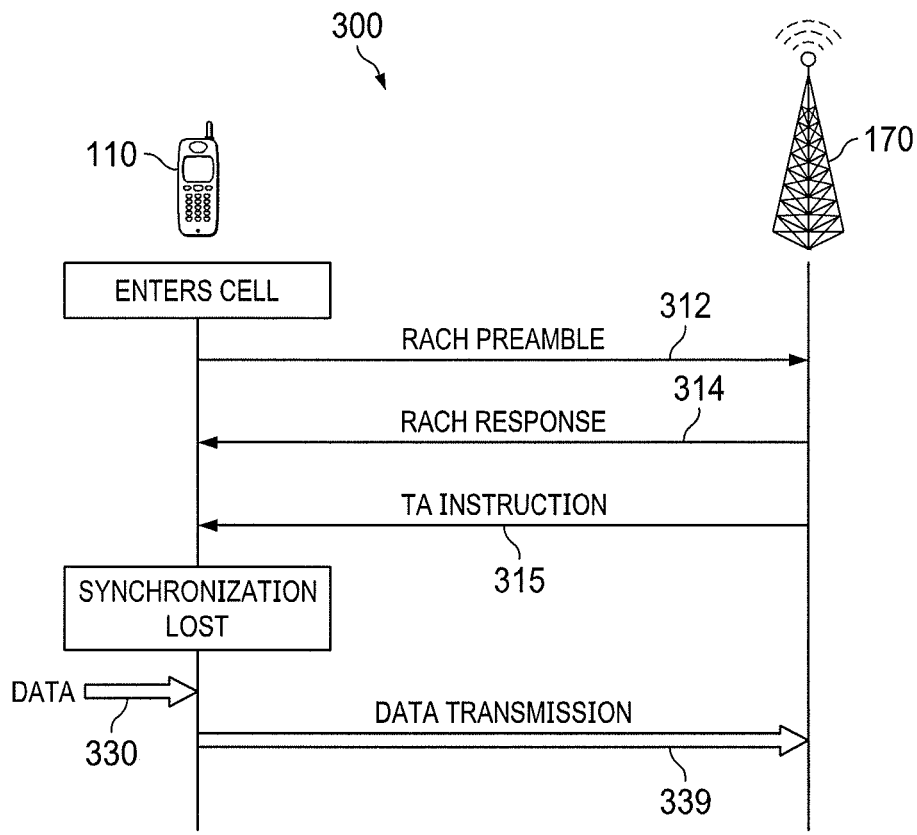
FIG. 3E is a protocol diagram of an embodiment communications sequence for performing initial grant-free uplink data transmissions.

FIG. 3E is a protocol diagram of an embodiment communications sequence 300 for performing initial grant-free uplink data transmissions. As shown, the UE 110 enters the cell of the base station 170, and sends a RACH preamble 312 to the base station 170. The base station 170 returns a RACH response 314 that specifies timing advance parameter value. In one embodiment, the RACH response is carrying a broadcasting message, for example, in a minimum system information (SI) or on-demand SI or other SI. The RACH response 314 may include other information as well, such as a preamble identifier (ID) carried by the RACH preamble 312, an initial uplink grant, and a Temporary Cell Radio Network Temporary Identifier (T-CRNTI).

At some point, the UE 110 loses synchronization with the base station 170. This may occur when the UE 110 goes into an idle mode, or exits and reenters the cell. Other scenarios may also result in the loss of synchronization, such as the UE 110 being powered down. After losing synchronization, the UE 110 generates, or receives, data 330. In this example, the UE 110 determines that initial grant-free uplink data transmissions can be sent directly without updating the timing advance parameter based on the TA instruction 315, and proceeds to transmit the initial grant-free uplink data transmission 339 without updating the timing advance parameter. The initial grant-free uplink data transmission 339 may be transmitted using a timing advance parameter value that was established before synchronization was lost, such as the timing advance parameter value specified by the RACH response 314. Alternatively, the initial grant-free uplink data transmission 339 may be performed without adjusting for timing advance, e.g., using a timing advance parameter set to zero.

Figure 4:
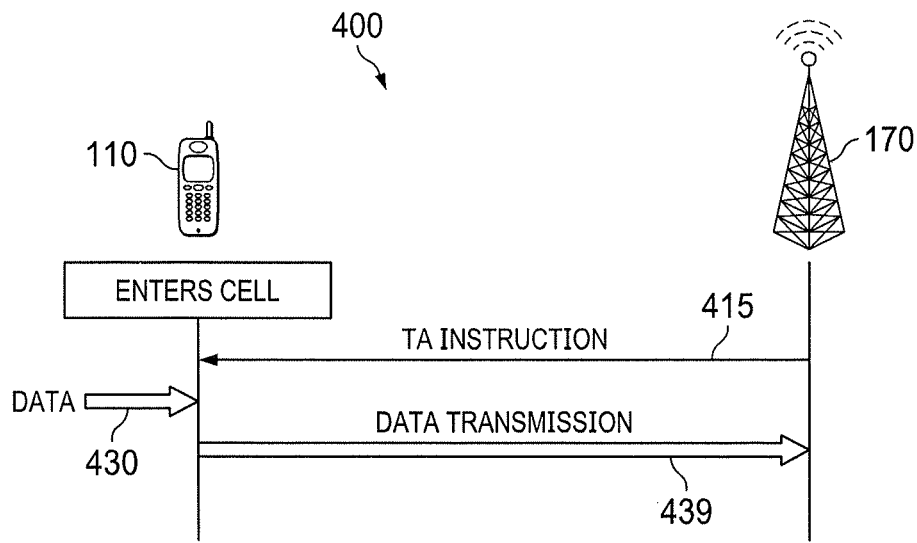
FIG. 4 is a protocol diagram of an embodiment communications sequence for performing initial grant-free uplink data transmissions.

Although the embodiment communications sequence 300 shows the occurrence of a RACH preamble procedure prior to the loss of synchronization between the UE 110 and the base station 170, it should be appreciated that, in some embodiments, initial grant-free uplink data transmissions are performed without ever establishing an initial timing advance value. FIG. 4 is a protocol diagram of an embodiment communications sequence 400 for performing initial grant-free uplink data transmissions. As shown, the UE 110 receives a timing advance instruction 415 from the base station 170 after entering the cell of the base station 170. The timing advance instruction 415 may indicate that initial grant-free uplink data transmissions can be performed directly in the cell of the base station 170 without using adjusting for timing advance. Alternatively, the timing advance instruction 415 may specify a criterion that must be satisfied in order for initial grant-free uplink data transmissions to be performed without using adjusting for timing advance. After receiving the timing advance instruction 415, the UE 110 receives or generates data 430, determines that initial grant-free uplink data transmissions can be sent directly without using a timing advance parameter based on the timing advance instruction 415, and transmits the initial grant-free uplink data transmission 439 without receiving a timing advance parameter value from the base station 170.

In some embodiments, a TA instruction received from one base station is used to determine whether an initial grant-free uplink data transmission can be transmitted to another base station without updating, or otherwise receiving, a timing advance adjustment value from the base station to which the initial grant-free uplink data transmission is sent.

Figure 5:
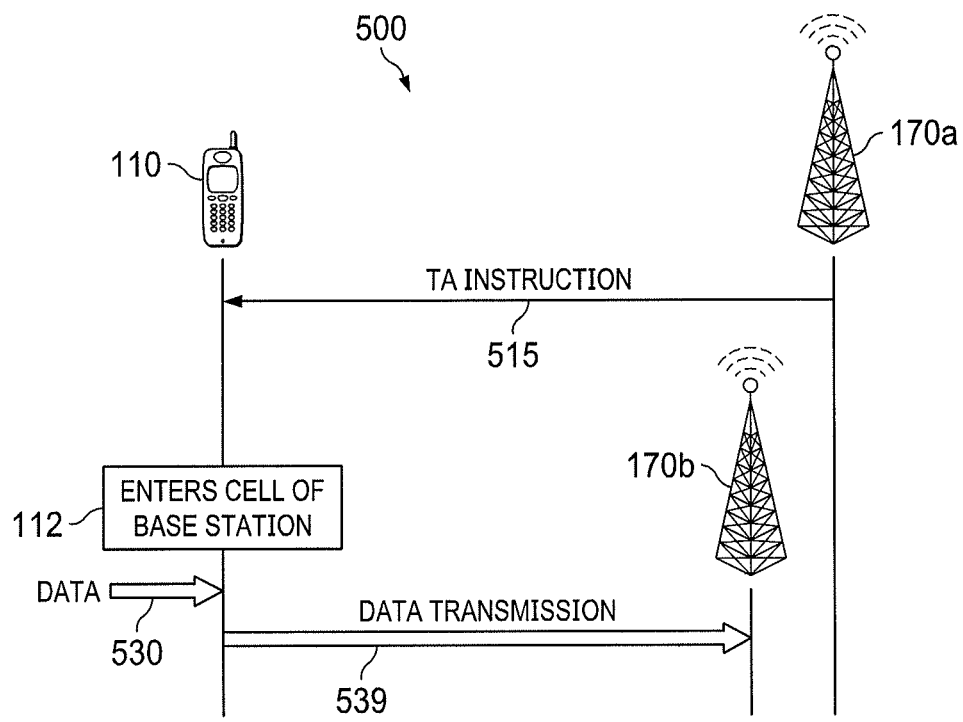
FIG. 5 is a protocol diagram of an embodiment communications sequence for performing initial grant-free uplink data transmissions.

FIG. 5 is a protocol diagram of an embodiment communications sequence 500 for performing initial grant-free uplink data transmissions. As shown, the UE 110 receives a timing advance instruction 515 from the base station 170a. The timing advance instruction 515 may identify a set of cells in which direct initial grant-free uplink data transmissions may be performed. Alternatively, it may identify a criterion for which a given cell must satisfy in order for direct initial grant-free uplink data transmissions to be performed in the cell. After receiving the timing advance instruction 515, the UE 110 enters the cell of the base station 170b, and determines, based on the timing advance instruction 515, that initial grant-free uplink data transmissions can be performed in the cell without receiving a timing advance adjustment value from the base station 170b. The UE 110 then transmits the initial grant-free uplink data transmission 539 to the base station 170b without receiving a timing advance parameter value from the base station 170b.

Figure 6A:
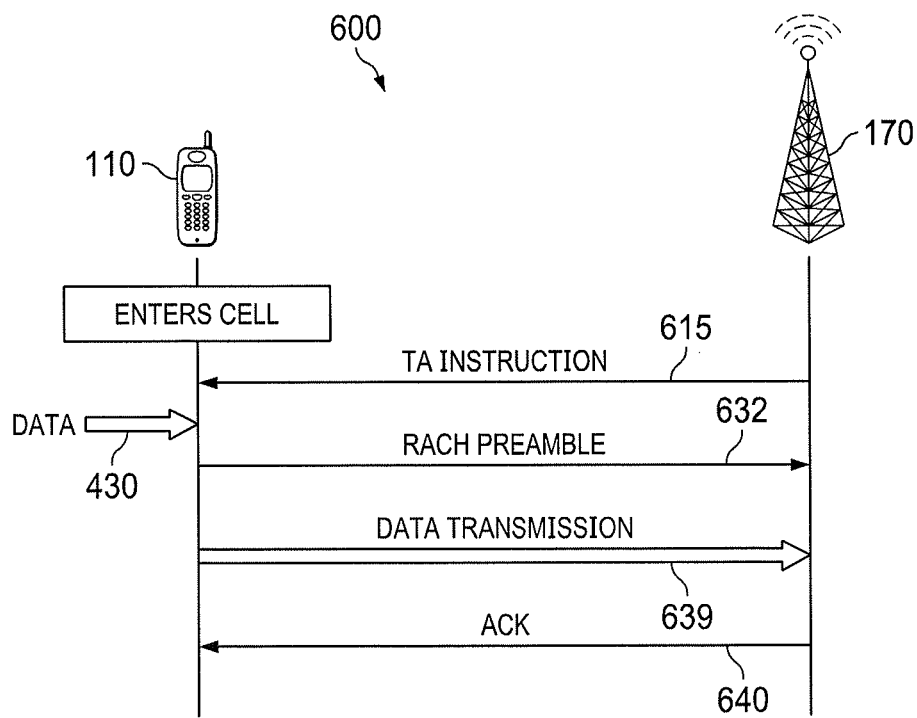
FIGS. 6A, 6B, and 6C are protocol diagrams of embodiment communication sequences for performing initial grant-free uplink data transmissions along with RACH preamble transmissions.
Figure 6B:
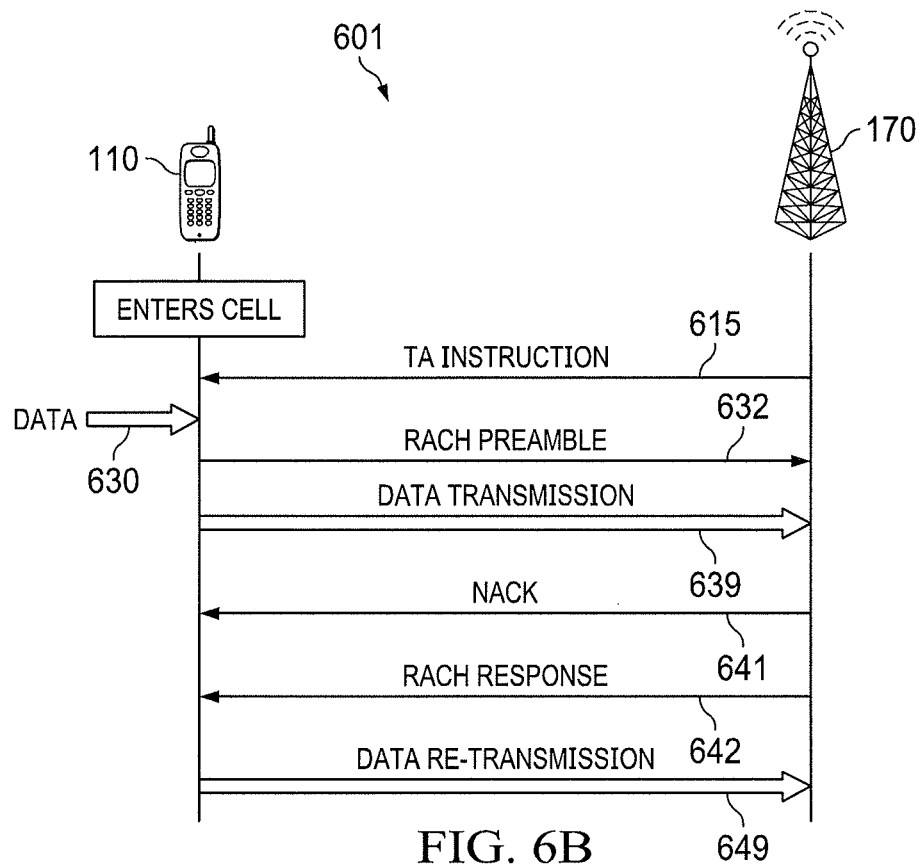

FIGS. 6A and 6B are protocol diagrams of embodiment communication sequences 600, 601 for performing initial grant-free uplink data transmissions along with RACH preamble transmissions. The embodiment communication sequences 600, 601 are similar, except that the initial grant-free uplink data transmission is successful in the embodiment communication sequence 600, but not in the embodiment communication sequence 601.

In both embodiment communication sequences 600, 601, the UE 110 enters the cell of the base station 170, receives a timing advance instruction 615, generates or receives data 630, and determines that initial grant-free uplink data transmissions can be sent directly without updating the timing advance parameter based on the timing advance instruction 615. Additionally, in both embodiment communication sequences 600, 601, the UE 110 transmit a RACH preamble 632 and an initial grant-free uplink data transmission 639 to the base station 170. It should be appreciated that the initial grant-free uplink data transmission 639 is sent before the UE 110 receives a response to the RACH preamble 632, and is therefore transmitted without updating, or in some cases using, a timing advance parameter.

In the embodiment communication sequence 600, the base station 170 successfully receives the initial grant-free uplink data transmission 639, and returns an acknowledgement message 640 to the UE 110.

However, in the embodiment communication sequence 601, the initial grant-free uplink data transmission 639 is not successfully decoded by the base station 170, and the base station 170 returns a negative acknowledgement (NACK) 641 and a RACH response 642 to the UE 110. The NACK 641 indicates that the initial grant-free uplink data transmission 639 was not successfully decoded, and prompts the UE 110 to perform a data re-transmission 649. The RACH response 642 indicates a timing advance value for the data re-transmission 649. In some cases, the RACH response 642 also indicates a resource allocation for the data re-transmission 649.

Figure 6C:
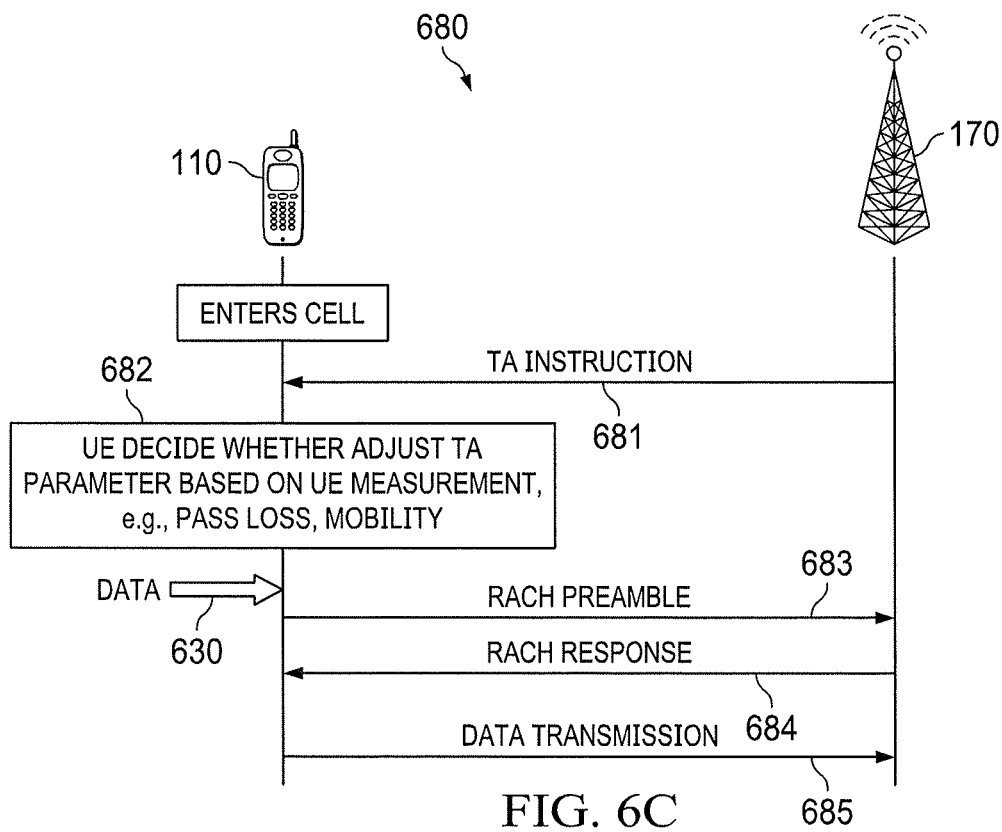

In one embodiment, shown in FIG. 6C, when a UE accesses a network, and receive a TA instruction to indicate directly data transmission without adjusting TA parameter. The UE measures its channel change, eg: pass loss or mobility changes, and UE detects changes beyond threshold, the UE decides to adjust TA parameter before the following data transmission, see the steps 681 and 682. The UE makes decision UL small data transmission directly or preamble based small data transmission: when the UE is moving in the cell. When small data transmission is necessary if this transmission is in the same cell and/or the path loss variant is smaller than some threshold such as x dB compared to the previous transmission, the UE will transmit data directly with pilot; if the cell changed compared to the previous transmission, UE will transmit preamble in order to achieve UL sync. The data transmission could be preamble+data (e.g. msg 1), and then TA will be transmitted in response to the UL transmission, and optionally an indication of small data transmission for future transmission, the transmission could also be only preamble, and data transmission can be in the next UL transmission, the steps 683 to 685 are the same with which has disclosed above.

In one embodiment, the mobile UE 110 moves around and may switch from one cell to another, the UE can make a decision to transmit UL small data transmission with different options, the first one is only to transmit UL small data transmission, the second one is to transmit UL small data transmission with RRC, and the third one is to transmit RRC.

In one aspect, when UE notification is configured in one cell (e.g. notification area is a single cell), if the cell does not change compared to the previous transmission, that means that the UE still stays in the cell, the UE transmit small data and/or BSR only. In this scenario, the UE and RAN side maintain synch security context and L2 entity (PDCP, RLC, MAC). If the cell changed compared to the previous transmission, that means the UE is to change to another cell, the UE will transmit RRC signaling in order to trigger to re-establish L2 entity. The data transmission could be the combination of RRC and small data, where RRC may include at least one information of the followings: source cell, UE ID, key ID, count-C/HFN or count-I/HFN in source cell. If the UE is changing a cell, a new cell UE ID and possible change key indication will be received by the UE.

In a second aspect, when UE notification is configured in N cells (e.g. notification area has N cells, N>1), if the UE stays in the same cell and the inactive timer expires after the previous transmission or receives an explicit signaling (RRC/MAC/PHY), UE release L2 entity (PDCP,RLC, MAC) except count. For UL transmission, if the cell changed or inactive timer expires or L2 entity released by explicit signaling from network compared to the previous transmission, the UE will transmit RRC signaling first or the combination of RRC and small data in order to trigger establishing L2 entity. For the DL transmission, the UE receives paging, then establish L2 entity and send RRC to network in order to trigger establishing L2 entity. The detail is given the following table 3:

TABLE 3

| | Notification area = single cell | Notification area = multiple cells |
|---|---|---|
| UE stays in same cell | Maintain cell specific context/L2 entity, Send Data | Send RRC or RRC +data to establish cell specific context/L2 entity, Maintain cell specific context/L2 entity until Inactive timer expires, Send data during inactive timer is running |
| UE moves to new cell | Send RRC or RRC +data, to establish cell specific context/L2 entity, | Send RRC or RRC +data, to establish cell specific context/L2 entity, |

HARQ procedures for grant-free uplink transmissions will now be described in more detail. HARQ procedures that already exist for grant-based schemes may not be applicable to grant-free uplink transmissions, because of the nature of grant-free uplink transmissions. For example, in a grant-free uplink transmission scheme, there may be no scheduling grant from the base station that specifies information such as which UEs are to transmit initial and retransmissions using which resources. Some of the systems and methods disclosed below may address problems such as how to perform ACK and/or NACK for grant-free uplink transmissions, how to determine and signal retransmission timing, and/or how to determine the transmission/retransmission attempt and the RV for HARQ operations.

As wireless networks evolve, diverse applications will require the networks to be able to serve different types of traffic and users in terms of quality of service (QoS) and capacity. For low latency applications, such as URLLC, and massive connectivity applications with a large number of users, such mMTC, as well as infrequent small packets in applications such as mMTC, URLLC and eMBB services, a user packet has to "arrive and go" to satisfy the latency requirements (e.g., URLLC) and/or to reduce signaling overhead (e.g., mMTC). Grant-free transmissions would be advantageous for these types of scenarios. For other applications, such as eMBB or large-packet transmissions with normal latency and reliability requirements, the grant-based schemes can be used. It is expected that a mix of grant-free and grant-based schemes will be simultaneously operational in future networks.

Therefore, a configuration procedure for users with grant-free and/or grant-based transmission schemes in a cell or the system would be beneficial for such future networks.

Figure 7:
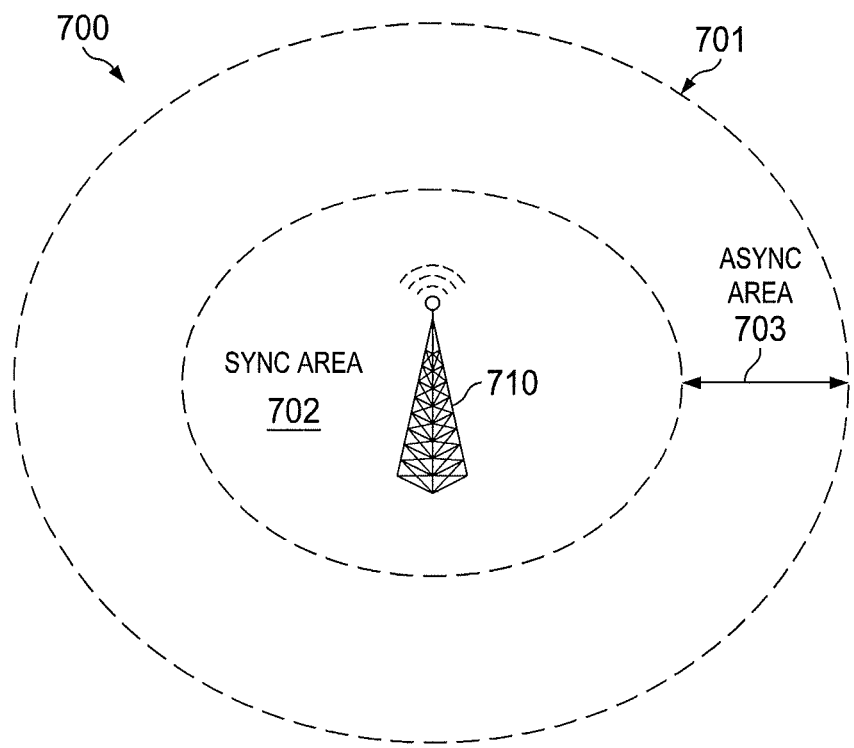
FIG. 7 is a diagram of a cell that includes synchronous and asynchronous regions.

In some embodiments, cell-center UEs are permitted to transmit initial grant-free uplink data transmissions directly without updating timing advance parameters, while cell-edge UEs are required to update timing advance parameters prior to performing initial grant-free uplink data transmissions. FIG. 7 is a diagram of an embodiment cell configuration 700 for a base station 710. In this example, UEs positioned within a synchronization area 702 of a cell 701 of the base station 710 are permitted to perform initial grant-free uplink data transmissions directly without updating timing advance parameters, while UEs positioned within an asynchronized area 703 of the cell 701 are required to update their timing advance parameters before performing initial grant-free uplink data transmissions.

Figure 8:
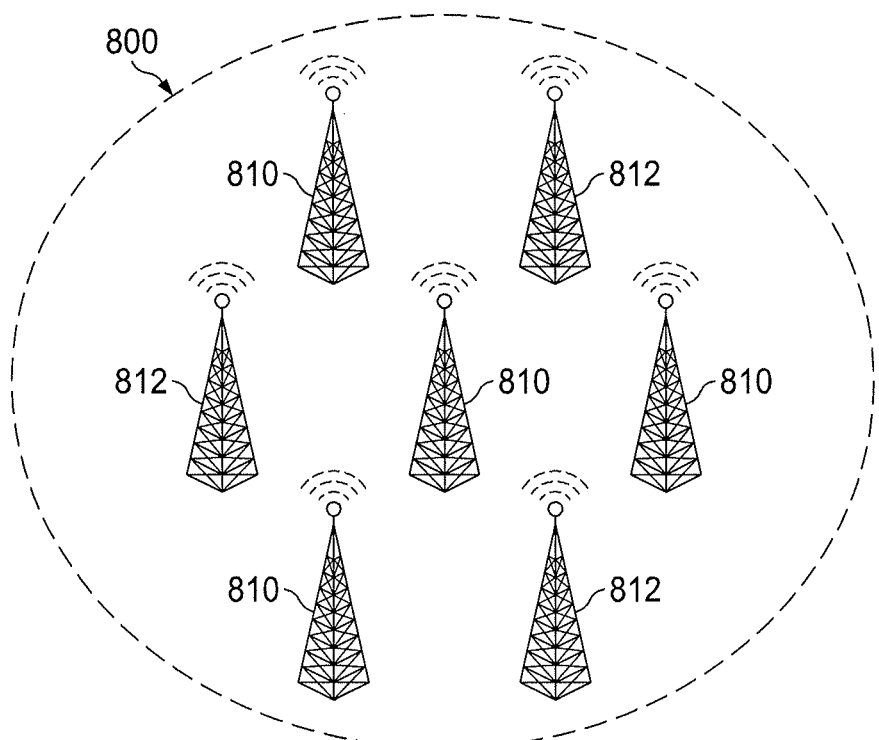
FIG. 8 is a diagram of a cluster of cells that includes synchronous and asynchronous cells.

In some embodiments, a cluster of cells may include some cells in which initial grant-free uplink data transmissions can be transmitted directly without updating timing advance parameters, and other cells in which UEs are required to update timing advance parameters before performing initial grant-free uplink data transmissions. FIG. 8 is a diagram of an embodiment cluster of cells 800 that includes base stations 810, 812. The base stations 810 are located in cells that permit initial grant-free uplink data transmissions to be transmitted directly without updating timing advance parameters. The base stations 812 are located in cells that require UEs to update timing advance parameters before performing initial grant-free uplink data transmissions. In an embodiment, when a UE enters a cell within the cluster of cells 800, it may receive a timing advance instruction from a corresponding one of the base stations 810, 812 that indicates a list of cells that permit initial grant-free uplink data transmissions to be transmitted directly without updating timing advance parameters.

Figure 9:
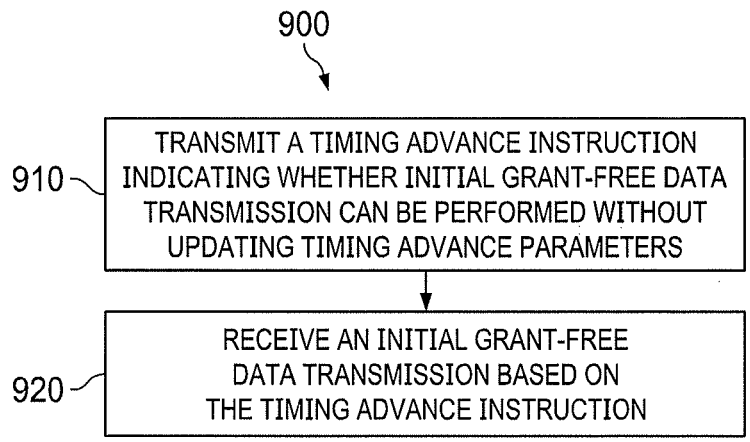
FIG. 9 is a flowchart of an embodiment method for configuring a cell for direct initial grant-free uplink data transmissions.

FIG. 9 is a flowchart of an embodiment method 900 for configuring a cell for direct initial grant-free uplink data transmissions, as may be performed by a base station. At step 910, the base station transmits a timing advance instruction to one or more UEs that indicates whether initial grant-free uplink data transmission can be performed by the one or more UE without updating timing advance parameters. At step 920, the base station receives an initial grant-free uplink data transmission based on the timing advance instruction.

Figure 10:
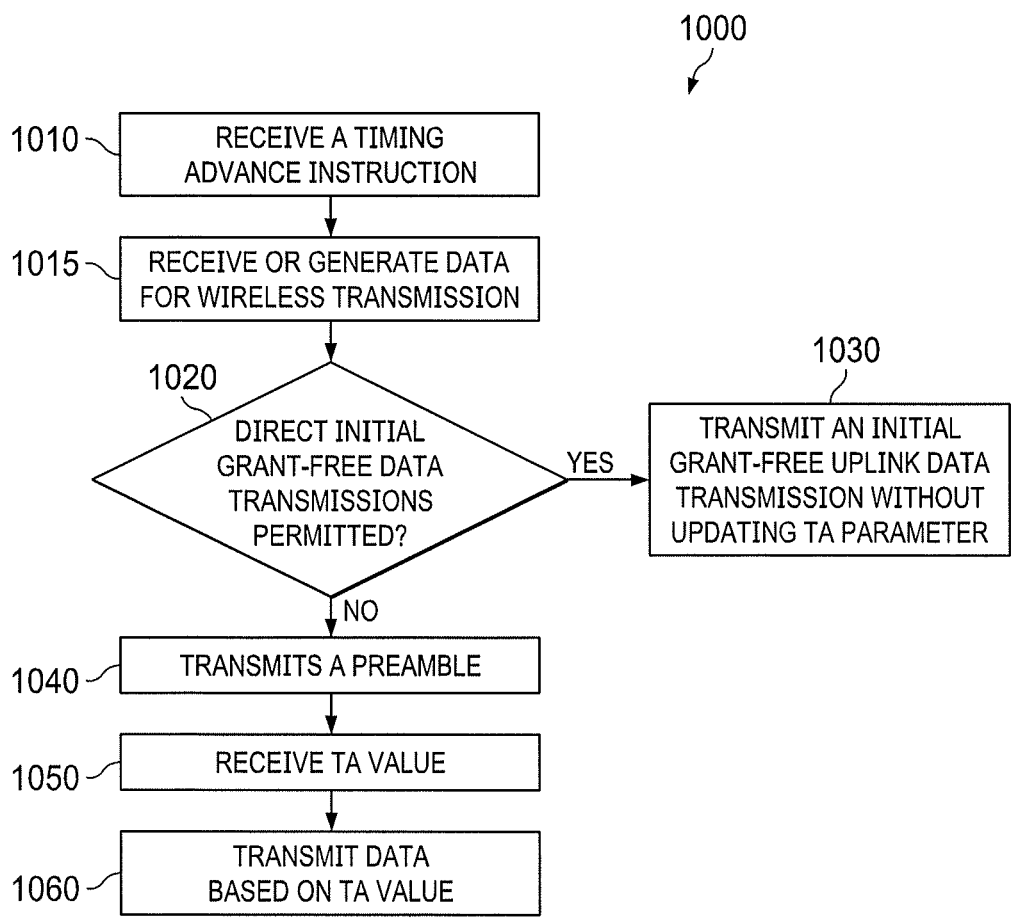
FIG. 10 is a flowchart of an embodiment method for performing direct initial grant-free uplink data transmissions

FIG. 10 is a flowchart of an embodiment method 1000 for performing direct initial grant-free uplink data transmissions, as may be performed by a UE. At step 1010, the UE receives a timing advance instruction from a base station. In one embodiment, the timing advance instruction indicates that an initial grant-free uplink data transmission can be transmitted in a cell associated with the base station without updating a TA parameter. In another embodiment, the timing advance instruction indicates a subset of cells in which initial grant-free uplink data transmissions are permitted to be transmitted without updating a TA parameter. In yet another embodiment, the timing advance instruction indicates a criterion that must be satisfied in order for direct grant-free uplink data transmissions to be permitted. At step 1015, the UE receives, or generates, data. At step 1020, the UE determines whether initial grant-free data transmissions can be performed directly without updating a timing advance parameter based on the timing advance instruction. If so, the UE transmits an initial grant-free uplink data transmission without updating TA parameter at step 1030. Otherwise, the UE transmits a preamble to the base station at step 1040, receives a TA value from the base station at step 1050, and transmits the data according to the TA value at step 1060.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

FIG. 13 illustrates an exemplary flowchart of an embodiment method 1300 for a UE to receive and process the timing advance (TA) instruction. Method 1300 starts at step 1302, where a user equipment (UE) receives a timing advance (TA) instruction. The TA instruction indicates one of at least two TA options. The first TA option indicates direct initial grant-free (GF) uplink (UL) data transmissions. The second TA option indicates indirect initial GF UL data transmissions with the UE initiating TA reference signaling for updating a TA parameter of the UE. The TA instruction may be transmitted by a base station to the UE using a broadcast signal. The TA instruction may also be transmitted by a base station to the UE using a Radio Resource Control (RRC) signal. In one embodiment, a TA reference signal sent by the UE is a preamble.

In conventional systems, a UE updates its TA parameter upon expiration of a timer. In contrast, in the present disclosure, a UE may receive the TA instruction in response to the base station determining one of the at least two TA options. In some embodiments, the base station determines one of the at least two TA options based on at least one of a cell size associated with the base station, a cyclic prefix (CP) type, or mobility of the UE. Further, in one embodiment, the base station determines one of the at least two TA options when the UE is in an inactive state or in an idle state. In another embodiment, the base station determines one of the at least two TA options when the UE moves out of the current cell of the UE.

In addition, in one embodiment, the TA instruction received by the UE further comprises a data transmission indication. The data transmission indication may indicate one of a pilot based data transmission, or a preamble based data transmission.

At step 1304, the UE performs an initial GF UL data transmission to the base station based on the TA instruction. In some embodiments, when the TA instruction indicates the first TA option, the UE may perform the initial GF UL data transmission to the base station without transmitting TA reference signaling for updating a TA parameter of the UE.

In some embodiments, when the TA instruction indicates the second TA option, the UE first may transmit a TA reference signal to the base station. Next, the UE may receive a TA adjustment message to update the TA parameter of the UE. Then, the UE may perform the initial GF UL data transmission to the base station based on the updated TA parameter of the UE.

In some embodiments, when the TA instruction indicates the second TA option, the UE may perform the initial UL data transmission with a TA reference signal to the base station. Then, the UE may receive a TA adjustment message from the base station to update the TA parameter of the UE. Before transmitting the TA adjustment message to the UE, the base station may perform signal detection on the initial GF UL data transmission using the TA reference signal for UE timing and channel estimation.

In some embodiments, after performing the initial GF UL data transmission to the base station, the UE receives an acknowledgement response from the base station. The acknowledgement response may indicate that the initial GF UL data transmission is unsuccessful. The acknowledgement response may further indicate whether retransmissions should be contention based or contention-free based. Then, the UE may perform retransmission of the initial GF UL data transmission to the base station based on the acknowledgment response.

In some embodiments, the TA instruction identifies one or more cells in which initial GF UL data transmissions are allowed without transmitting TA reference signaling for updating the TA parameter of the UE. When the UE enters one of the one or more cells indicated in the TA instruction, the UE may perform the initial GF UL data transmission to the base station without transmitting TA reference signaling for updating the TA parameter of the UE.

In some embodiments, the TA instruction identifies one or more cells in which initial GF UL data transmissions are allowed without transmitting TA reference signaling for updating the TA parameter of the UE. When the UE exits the one or more cells indicated in the TA instruction, the UE may receive a second TA instruction indicating one of the at least two TA options from the base station.

In one embodiment, when the TA instruction indicates the first TA option, the UE performs a first initial GF UL data transmission without transmitting TA reference signaling for updating the TA parameter of the UE. Next, the UE may transmit a TA reference signal to the base station based on UE measurement conditions. The UE measurement conditions may include at least one of channel variations, mobility, or locations in a cell. Then, the UE may receive from the base station an acknowledgement response. The acknowledge response may comprise a TA adjustment message. After the UE updates the TA parameter of the UE based on the acknowledgement response from the base station, the UE may perform a second initial GF UL data transmission to the base station.

In some embodiments, when the TA instruction indicates the first TA option, the UE performs a first initial GF UL data transmission without transmitting TA reference signaling for updating the TA parameter of the UE. Then, the UE may perform a second initial GF UL data transmission with a TA reference signal to the base station based on UE measurement conditions. The UE measurement conditions may include at least one of channel variations, mobility, or locations in a cell. Next, the base station performs signal detection on the second initial GF UL data transmission using the TA reference signal for timing and channel estimation of the UE. After the base station performs the signal detection, the UE may receive a TA adjustment message to update the TA parameter of the UE. Further, the UE may perform a third initial GF UL data transmission without transmitting TA reference signaling for updating the TA parameter of the UE.

FIG. 14 illustrates an exemplary flowchart of an embodiment method 1200 for a base station to transmit the timing advance (TA) instruction and receiving uplink transmissions from the UE. Method 1400 starts at step 1402, where the base station transmits a timing advance (TA) instruction to the UE. The TA instruction indicates one of at least two TA options. The first TA option indicates direct initial grant-free (GF) uplink (UL) data transmissions. The second TA option indicates indirect initial GF UL data transmissions with the UE initiating TA reference signaling for updating a TA parameter of the UE. The base station may transmit the TA instruction to the UE using a broadcast signal. The base station may also transmit the TA instruction to the UE using a Radio Resource Control (RRC) signal. In one embodiment, a TA reference signal received by the base station is a preamble.

In conventional systems, a UE updates its TA parameter upon expiration of a timer. In contrast, in the present disclosure, a base station first determines one of the at least two TA options, and the base station transmits the TA instruction to the UE in response to the determining the TA option. In some embodiments, the base station may determines the one of the at least two TA options based on at least one of a cell size associated with the base station, a cyclic prefix (CP) type, or mobility of the UE. Further, in one embodiment, the base station determines one of the at least two TA options when the UE is in an inactive state or in an idle state. In another embodiment, the base station determines one of the at least two TA options when the UE moves out of the current cell of the UE.

In addition, in one embodiment, the TA instruction transmitted by the base station further comprises a data transmission indication. The data transmission indication may indicate one of a pilot based data transmission, or a preamble based data transmission.

At step 1404, the base station receives an initial GF UL data transmission based on the TA instruction. In some embodiments, when the TA instruction indicates the first TA option, the base station may receive the initial GF UL data transmission from the UE without receiving TA reference signaling for updating a TA parameter of the UE.

In some embodiments, when the TA instruction indicates the second TA option, the base station first may receive a TA reference signal from the UE. Next, the base station may transmit a TA adjustment message to update the TA parameter of the UE. Then, the base station may receive the initial GF UL data transmission based on the updated TA parameter of the UE.

In some embodiments, when the TA instruction indicates the second TA option, the base station may receive the initial UL data transmission with a TA reference signal from the UE. The base station may perform signal detection on the initial GF UL data transmission using the TA reference signal for UE timing and channel estimation. Afterwards, the base station may transmit a TA adjustment message to the UE to update a TA parameter of the UE.

In some embodiments, after receiving the initial GF UL data transmission from the UE, the base station transmits an acknowledgement response to the UE. The acknowledgement response may indicate that the initial GF UL data transmission is unsuccessful. The acknowledgement response may further indicate whether retransmissions should be contention based or contention-free based. Then, the base station receives retransmission of the initial GF UL data transmission from the UE based on the acknowledgment response.

In some embodiments, the TA instruction identifies one or more cells in which initial GF UL data transmissions are allowed without the UE transmitting TA reference signaling for updating the TA parameter of the UE. When the base station detects that the UE enters one of the one or more cells, the base station may receive from the UE the initial GF UL data transmission without receiving TA reference signaling for updating the TA parameter of the UE.

In some embodiments, the TA instruction identifies one or more cells in which initial GF UL data transmissions are allowed without the UE transmitting TA reference signaling for updating the TA parameter of the UE. When the base station detects that the UE exits one of the one or more cells, the base station may transmit to the UE a second TA instruction indicating one of the at least two TA options.

In one embodiment, when the TA instruction indicates the first TA option, the base station receives from the UE a first initial GF UL data transmission without receiving TA reference signaling for updating the TA parameter of the UE. Next, the base station receives from the UE a TA reference signal based on UE measurement conditions. The UE measurement conditions may include at least one of channel variations, mobility, or locations in a cell. Then, the base station may transmit to the UE an acknowledgement response. The acknowledge response may comprise a TA adjustment message. After the UE updates the TA parameter of the UE based on the acknowledgement response from the base station, the base station may receive a second initial GF UL data transmission to the base station.

In some embodiments, when the TA instruction indicates the first TA option, the base station receives from the UE a first initial GF UL data transmission without receiving TA reference signaling for updating the TA parameter of the UE. Then, the base station may receive from the UE a second initial GF UL data transmission with a TA reference signal based on UE measurement conditions. The UE measurement conditions may include at least one of channel variations, mobility, or locations in a cell. Next, the base station performs signal detection on the second initial GF UL data transmission using the TA reference signal for timing and channel estimation of the UE. After the base station performs the signal detection, the base station may transmit to the UE a TA adjustment message to update a TA parameter of the UE. Further, the base station may receive a third initial GF UL data transmission without receiving TA reference signaling for updating the TA parameter of the UE.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method comprising:
    receiving, by a user equipment (UE) from a base station, a timing advance (TA) instruction indicating a TA option, wherein the TA option indicates direct initial grant-free (GF) uplink (UL) data transmissions; and
    performing, by the UE to the base station, an initial GF UL data transmission based on the TA instruction without transmitting TA reference signaling for updating a TA parameter of the UE.

2. The method of claim 1, further comprising:
    after the performing the initial GF UL data transmission:
        receiving, by the UE from the base station, a second TA instruction indicating a second TA option, wherein the second TA option indicates indirect initial GF UL data transmissions;
        transmitting, by the UE to the base station, a TA reference signal only or a second initial UL data transmission with the TA reference signal;
        receiving, by the UE from the base station, an acknowledgement response comprising a TA adjustment message;
        updating, by the UE, the TA parameter based on the TA adjustment message; and
        performing, by the UE to the base station, a third initial GF UL data transmission using the updated TA parameter.

3. The method of claim 2, wherein the TA instruction is received in a broadcast signal or a Radio Resource Control (RRC) signal, and the second TA instruction is received in a second broadcast signal or a second RRC signal.

4. The method of claim 2, wherein the TA reference signal is a preamble.

5. The method of claim 1, further comprising:
    performing, by the UE to the base station, a second initial GF UL data transmission with a TA reference signal based on UE measurement conditions;
    receiving, by the UE from the base station, a TA adjustment message;
    updating, by the UE, the TA parameter based on the TA adjustment message; and
    performing, by the UE to the base station, a third initial GF UL data transmission without transmitting TA reference signaling for updating the TA parameter.

6. The method of claim 1, wherein the UE performs the initial GF UL data transmission in an inactive state.

7. A method comprising:
    transmitting, by a base station to a user equipment (UE), a timing advance (TA) instruction indicating a TA option, wherein the TA option indicates direct initial grant-free (GF) uplink (UL) data transmissions; and
    receiving, by the base station from the UE, an initial GF UL data transmission based on the TA instruction without receiving TA reference signaling for updating a TA parameter of the UE.

8. The method of claim 7, further comprising:
    after the receiving the initial GF UL data transmission:
        transmitting, by the base station to the UE, a second TA instruction indicating a second TA option, wherein the second TA option indicates indirect initial GF UL data transmissions;
        receiving, by the base station from the UE, a TA reference signal only or a second initial UL data transmission with the TA reference signal;
        transmitting, by the base station to the UE, an acknowledgement response comprising a TA adjustment message for the UE to update the TA parameter; and
        receiving, by the base station from the UE, a third initial GF UL data transmission using the updated TA parameter.

9. The method of claim 8, wherein the TA instruction is received in a broadcast signal or a Radio Resource Control (RRC) signal, and the second TA instruction is transmitted in a second broadcast signal or a second RRC signal.

10. The method of claim 8, wherein the TA reference signal is a preamble.

11. The method of claim 7, further comprising:
receiving, by the base station from the UE, a second initial GF UL data transmission with a TA reference signal based on UE measurement conditions;
transmitting, by the base station to the UE, a TA adjustment message for the UE to update the TA parameter; and
receiving, by the base station from the UE, a third initial GF UL data transmission without receiving TA reference signaling for updating the TA parameter.

12. The method of claim 7, wherein the base station receives the initial GF UL data transmission when is UE is in an inactive state.

13. A user equipment (UE) comprising:
a processor; and
a non-transitory computer-readable storage medium storing programming to be executed by the processor, the programming comprising instructions for:
receiving, from a base station, a timing advance (TA) instruction indicating a TA option, wherein the TA option indicates direct initial grant-free (GF) uplink (UL) data transmissions; and
performing, to the base station, an initial GF UL data transmission based on the TA instruction without transmitting TA reference signaling for updating a TA parameter of the UE.

14. The UE of claim 13, the programming further comprising instructions for:
after the performing the initial GF UL data transmission:
receiving, from the base station, a second TA instruction indicating a second TA option, wherein the second TA option indicates indirect initial GF UL data transmissions;
transmitting, to the base station, a TA reference signal only or a second initial UL data transmission with the TA reference signal;
receiving, from the base station, an acknowledgement response comprising a TA adjustment message;
updating the TA parameter based on the TA adjustment message; and
performing, to the base station, a third initial GF UL data transmission using the updated TA parameter.

15. The UE of claim 14, wherein the TA instruction is received in a broadcast signal or a Radio Resource Control (RRC) signal, and the second TA instruction is received in a second broadcast signal or a second RRC signal.

16. The UE of claim 13, the programming further comprising instructions for:
performing, to the base station, a second initial GF UL data transmission with a TA reference signal based on UE measurement conditions;
receiving, from the base station, a TA adjustment message;
updating the TA parameter based on the TA adjustment message; and
performing, to the base station, a third initial GF UL data transmission without transmitting TA reference signaling for updating the TA parameter.

17. A base station comprising:
a processor; and
a non-transitory computer-readable storage medium storing programming to be executed by the processor, the programming comprising instructions for:
transmitting, to a user equipment (UE), a timing advance (TA) instruction indicating a TA option, wherein the TA option indicates direct initial grant-free (GF) uplink (UL) data transmissions; and
receiving, from the UE, an initial GF UL data transmission based on the TA instruction without receiving TA reference signaling for updating a TA parameter of the UE.

18. The base station of claim 17, the programming further comprising instructions for:
after the receiving the initial GF UL data transmission:
transmitting, to the UE, a second TA instruction indicating a second TA option, wherein the second TA option indicates indirect initial GF UL data transmissions;
receiving, from the UE, a TA reference signal only or a second initial UL data transmission with the TA reference signal;
transmitting, to the UE, an acknowledgement response comprising a TA adjustment message for the UE to update the TA parameter; and
receiving, from the UE, a third initial GF UL data transmission using the updated TA parameter.

19. The base station of claim 18, wherein the TA instruction is received in a broadcast signal or a Radio Resource Control (RRC) signal, and the second TA instruction is transmitted in a second broadcast signal or a second RRC signal.

20. The base station of claim 17, the programming further comprising instructions for:
receiving, from the UE, a second initial GF UL data transmission with a TA reference signal based on UE measurement conditions;
transmitting, to the UE, a TA adjustment message for the UE to update the TA parameter; and
receiving, from the UE, a third initial GF UL data transmission without receiving TA reference signaling for updating the TA parameter.

* * * * *